US010089796B1

(12) United States Patent
Ernst et al.

(10) Patent No.: US 10,089,796 B1
(45) Date of Patent: Oct. 2, 2018

(54) HIGH QUALITY LAYERED DEPTH IMAGE TEXTURE RASTERIZATION

(71) Applicant: Google LLC, Mountain View, CA (US)

(72) Inventors: Manfred Ernst, Sunnyvale, CA (US); Silviu Borac, Pacifica, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/800,343

(22) Filed: Nov. 1, 2017

(51) Int. Cl.
*G06T 17/00* (2006.01)
*G06T 19/20* (2011.01)
*G06T 15/04* (2011.01)
*G06T 7/529* (2017.01)

(52) U.S. Cl.
CPC .............. *G06T 19/20* (2013.01); *G06T 7/529* (2017.01); *G06T 15/04* (2013.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 6,184,888 B1* | 2/2001 | Yuasa | .................... | A61J 7/0481 345/419 |
| 6,473,082 B1* | 10/2002 | Hong | .................... | G06T 15/405 345/422 |
| 6,728,422 B1* | 4/2004 | Weiss | ....................... | G06T 17/00 345/419 |
| 6,954,202 B2* | 10/2005 | Han | ........................ | G06T 15/04 345/419 |
| 7,639,250 B2* | 12/2009 | Xu | .......................... | G06T 15/02 345/419 |
| 7,773,086 B2* | 8/2010 | Li | ........................... | G06T 15/08 345/419 |

(Continued)

FOREIGN PATENT DOCUMENTS

WO 2010037512 A1 4/2010

OTHER PUBLICATIONS

Decoret, "Matrix of projection on a plane", Mar. 2, 2006, 3 pages.

(Continued)

*Primary Examiner* — Martin Mushambo
(74) *Attorney, Agent, or Firm* — Brake Hughes Bellermann LLP

(57) ABSTRACT

In one general aspect, a method can include combining a partition polygon and a generated texture map to form a model of a scene for rendering in three dimensions in a virtual reality space. The generating of the texture map can include projecting a Layered Depth Image sample in a partition polygon to a point in a source camera window space, projecting the point back into the partition polygon as a surface element (surfel), projecting the surfel to a surfel footprint in a target camera window space, projecting from the target camera window space to the partition polygon, sub-pixel samples included in pixels covered by the surfel footprint, projecting the sub-pixel samples from the partition polygon and into the source camera window space, and applying a color weight to each sub-pixel sample based on the location of the sample in the source camera window space.

23 Claims, 16 Drawing Sheets

(56) References Cited

U.S. PATENT DOCUMENTS

| | | | |
|---|---|---|---|
| 2003/0052878 A1* | 3/2003 | Han | G06T 15/205 345/420 |
| 2007/0159541 A1 | 7/2007 | Sparks et al. | |
| 2008/0246759 A1* | 10/2008 | Summers | G06F 3/0304 345/420 |
| 2012/0243774 A1* | 9/2012 | Chen | G06T 15/205 382/154 |

OTHER PUBLICATIONS

Mitchell, et al., "Reconstruction Filters in Computer Graphics", Computer Graphics, vol. 22, No. 4, Aug. 1988, 8 pages.
Osher, et al., "Level Set Methods and Dynamic Implicit Surfaces", retrieved on Mar. 22, 2017 from http://www.springer.com/us/book/9780387954820, 9 pages.
Pfister, et al., "Surfels: Surface Elements as Rendering Primitives", SIGGRAPH 2000, pp. 335-342, 8 pages.
Porter, et al., "Compositing Digital Images", Computer Graphics, vol. 18, No. 3, Jul. 1984, 7 pages.
Shade, et al., "Layered Depth Images", SIGGRAPH 98, Jul. 19-24, 1998, 13 pages.

* cited by examiner

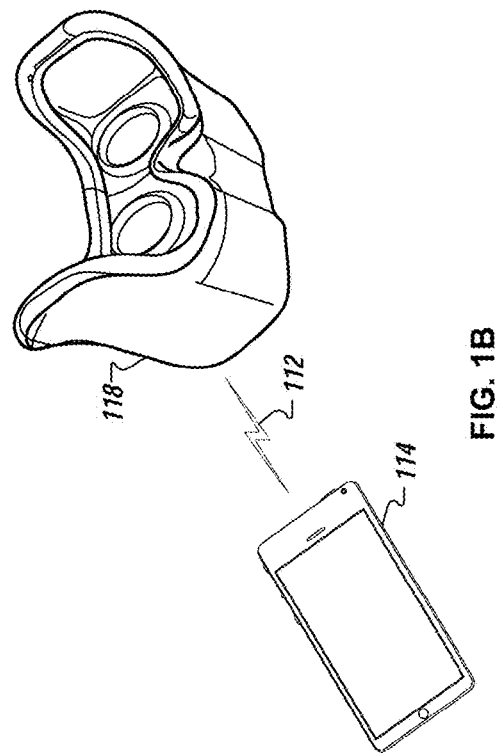
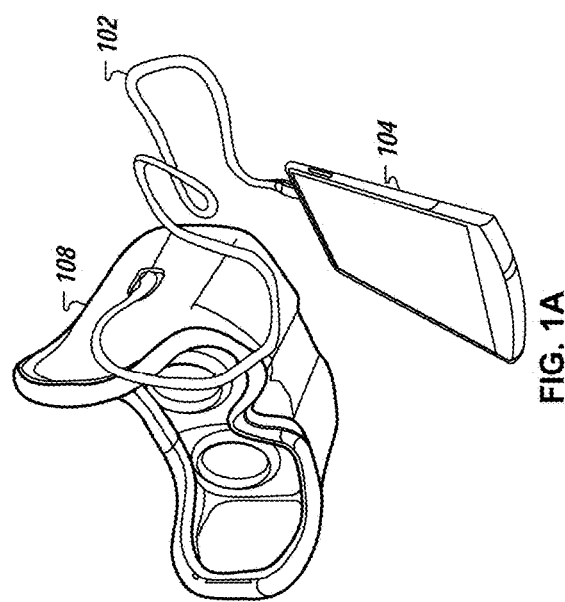
FIG. 1B
FIG. 1A

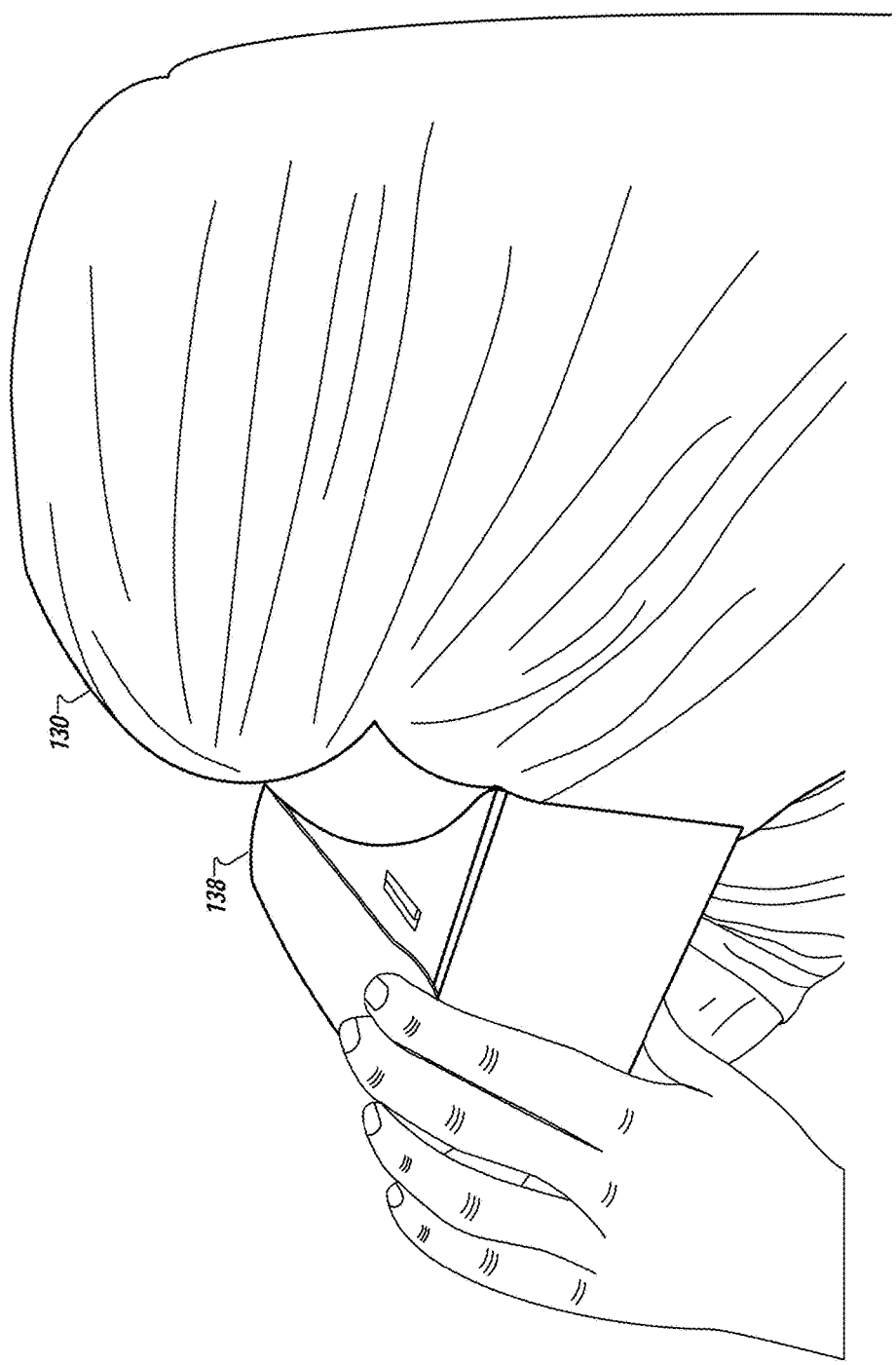

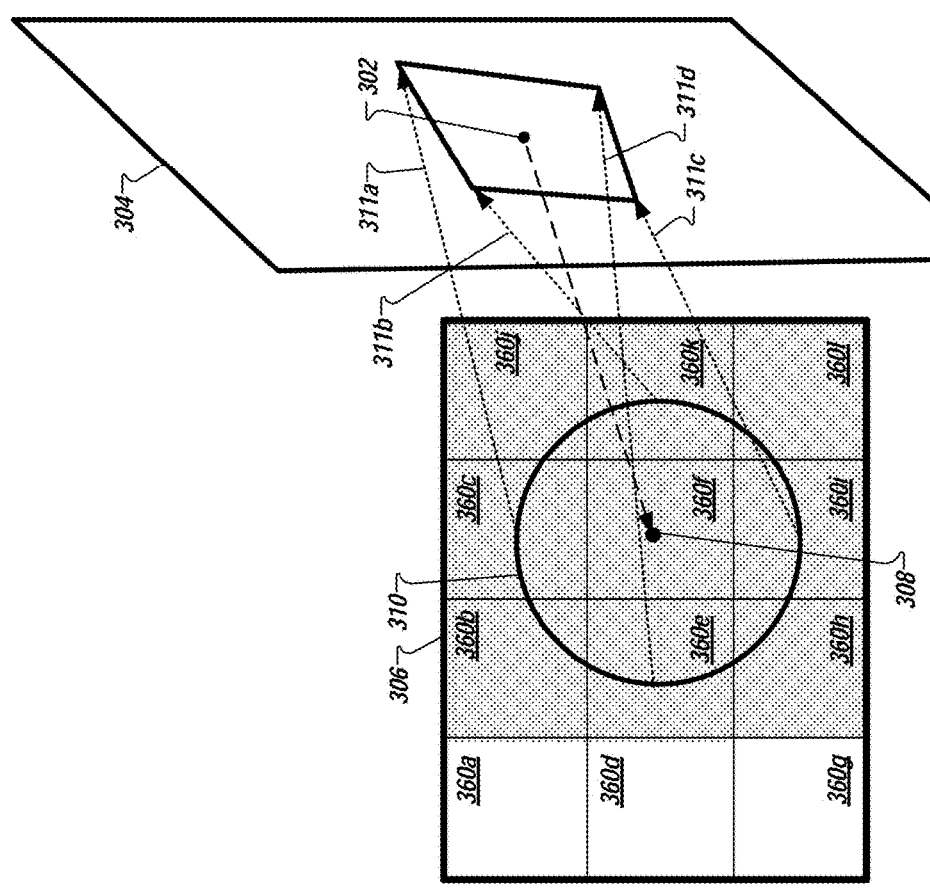

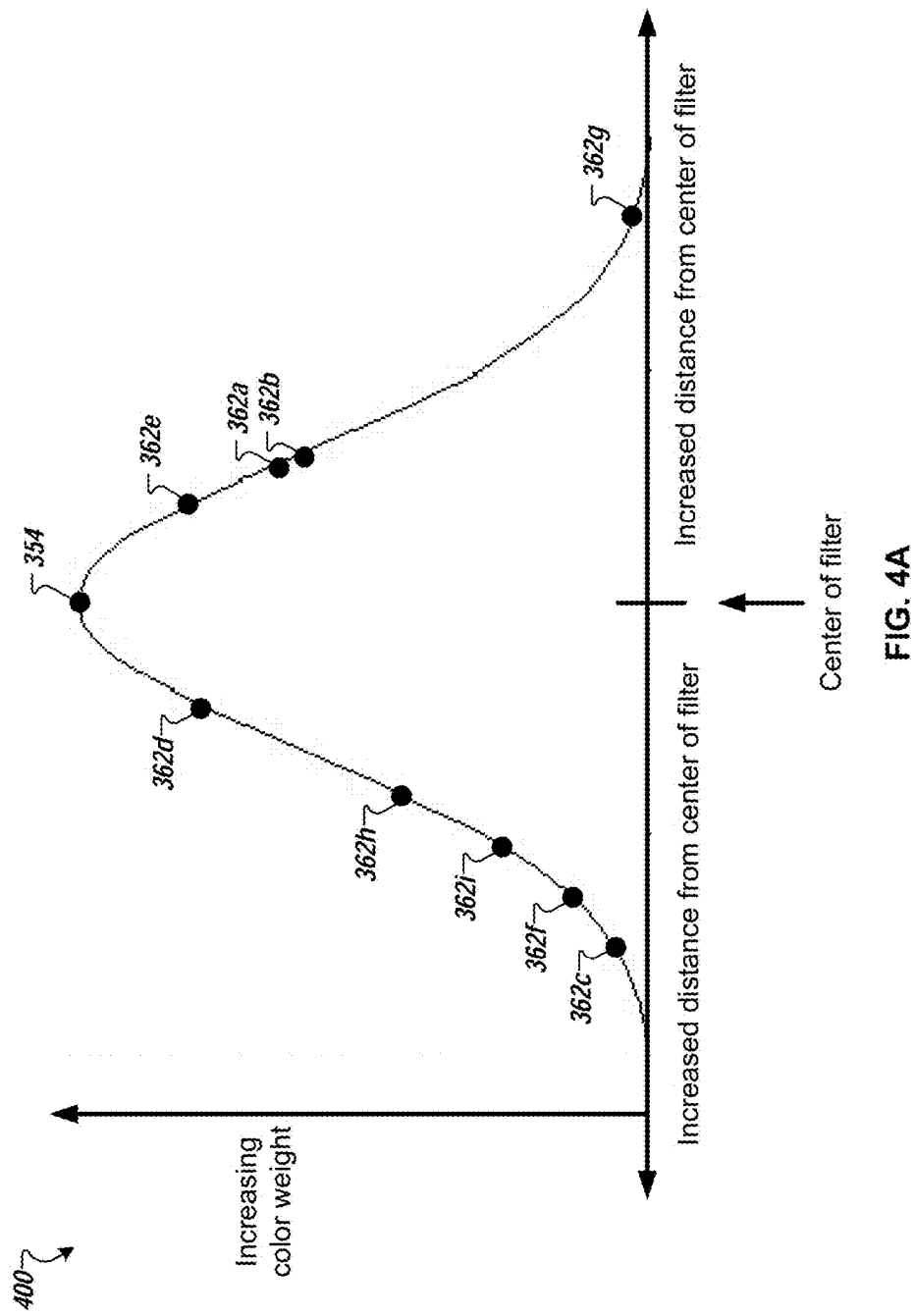

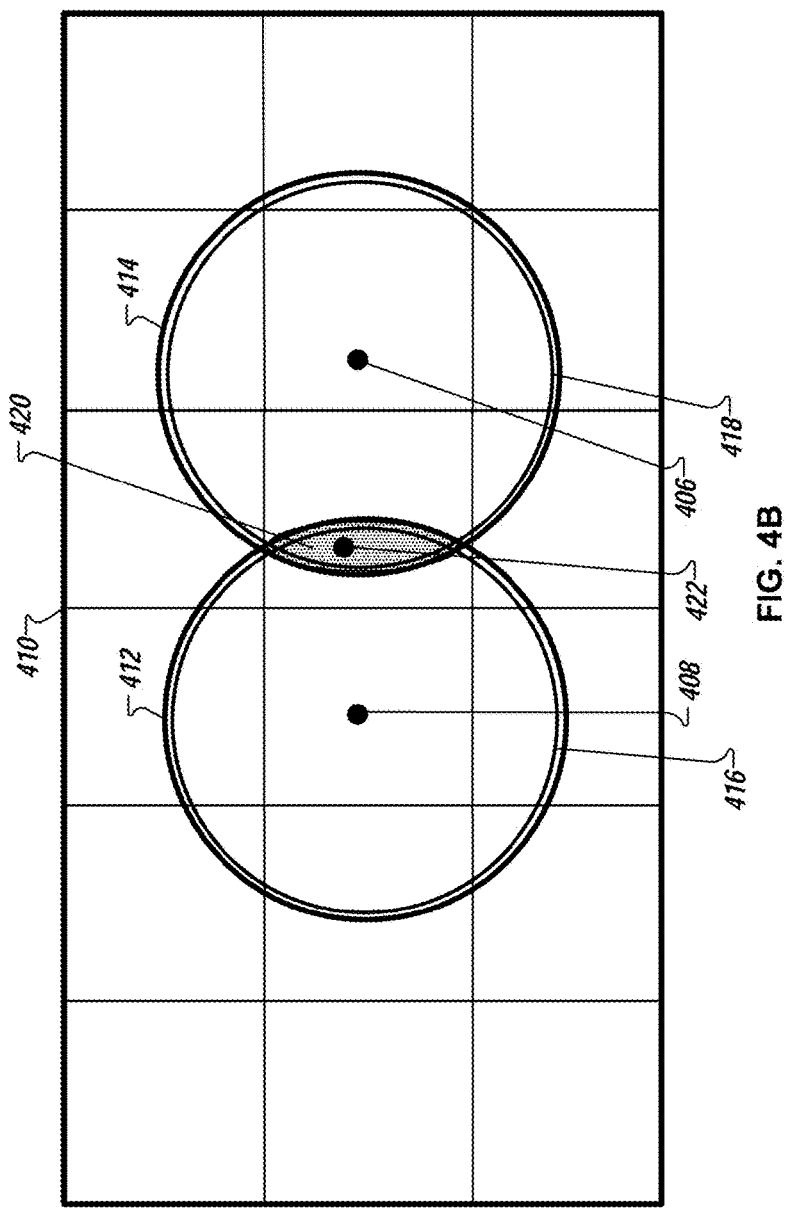

HIGH QUALITY LAYERED DEPTH IMAGE TEXTURE RASTERIZATION

TECHNICAL FIELD

This description generally relates to scene representations in a virtual reality (VR) space.

BACKGROUND

Image based rendering (IBR) techniques can be used to represent, shade, and render geometrically complex objects or scenes. A Layered Depth Image (LDI) can be an image-based technique that can be used for representing and rendering objects with complex geometries. LDIs can be used as an intermediate representation when processing a complex three-dimensional (3D) scene into a format that can be efficiently rendered on a computing device (e.g., a mobile computing device).

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method can include generating, by a computing system, a texture map for a partition polygon including projecting a Layered Depth Image (LDI) sample in a partition polygon to a point in a source camera window space, projecting the point in the source camera window space back into the partition polygon as a surface element (surfel) having an associated color at a location of the LDI sample in the partition polygon, projecting the surfel in the partition polygon to a surfel footprint in a target camera window space, the surfel footprint covering at least one pixel included in an image plane of the target camera window space, projecting from the target camera window space to the partition polygon, each of a plurality of sub-pixel samples included in the at least one pixel, projecting from the partition polygon and into the source camera window space, each of the plurality of sub-pixel samples, the projecting determining a location in the source camera window space for each of the plurality of sub-pixel samples, and applying a color weight to each sub-pixel sample based on the location of each sub-pixel sample in the source camera window space. The computer-implemented method can further include combining, by the computing system, the partition polygon and the texture map, the combining forming a model of a scene for rendering in real time in three dimensions (3D) in a virtual reality space.

Implementations can include one or more of the following features, alone or in combination with one or more other features. For example, the LDI sample can be a one of a plurality of LDI samples included in a layered depth image (LDI) included in the partition polygon. Projecting the LDI sample in the partition polygon to the point in the source camera window space can be performed for each LDI sample included in the plurality of LDI samples included in the partition polygon. The at least one pixel can be filled with the color associated with the surfel. The point in the source camera window space can be placed at a center of a filter support included in the source camera window space. Projecting the point in the source camera window space back into the partition polygon can include projecting the point along with vertices of a minimum size rectangle that includes the filter support. The projecting of the point in the source camera window space back into the partition polygon can include projecting the filter support into the partition polygon, and projecting a pixel defined by the filter support in the source camera window space into the partition polygon. The color associated with the surfel can be based on a color of the pixel. The filter support can be a circle having a particular radius and being centered at the point in the source camera window space. The filter support can define a shape that overlaps pixels included in the source camera window space. The shape of the filter can define a size for the point projected from the source camera window space back into the partition polygon resulting in the surfel. Projecting the surfel in the partition polygon to the surfel footprint in the target camera window space can be performed for each surfel included in the partition polygon. The target camera window space can be an image plane including a plurality of pixels. The plurality of pixels can identify a resolution of the image plane. A projected surfel footprint for the projected surfel can cover one or more of the pixels in the image plane. The one or more of the pixels can be the color associated with the surfel. The color weight can be based on a distance that a sub-pixel is from a center point of a filter support, the sub-pixel being included in the filter support.

In another general aspect, a computer-implemented method can include assigning, by a computing system and for each surfel included in a partition polygon, a color and an opacity to a surfel. The assigning can include associating a respective source filter function with each surfel included in the partition polygon, the source filter function determining an amount of alpha coverage of the partition polygon provided by the respective surfel, associating a target filter function with the partition polygon, the target filter function providing a projection of a surfel footprint into a partition polygon to be fully opaque and providing a falling off of the assigned opacity of a surfel as a distance for a center point for a surfel increases from an interior of the partition polygon, and calculating alpha coverage for a partition polygon as a level set function of the surfels included in the partition polygon and as a level set function for the partition polygon.

Implementations can include one or more of the following features, alone or in combination with one or more other features. For example, a level set function of the surfel can be the associated respective source filter function centered at a position of the surfel. A level set function for the partition polygon can be the associated target filter function. The associated target filter function can correspond to a set union over the surfels included in the partition polygon. The associated target filter function that corresponds to the set union over the surfels included in the partition polygon can take, at each point in a texture space, a maximum value over surfel source filter functions that contribute to that texture space point. A same analytical form for a filter can be used for both the source filter function and the target filter function. Surfels included in the partition polygon can be placed into two or more groups. Each group of surfels can be associated with a particular filter function.

The details of one or more implementations are set forth in the accompanying drawings and the description below.

Other features will be apparent from the description and drawings, and from the claims.

BRIEF DESCRIPTION OF THE DRAWINGS

FIG. 1A is a diagram that illustrates a mobile computing device connected to (interfacing with) a VR headset using a cable.

FIG. 1B is a diagram that illustrates a mobile computing device connected to (interfacing with) a VR headset using a wireless connection.

FIG. 1D is a diagram that shows a user wearing a VR headset.

FIGS. 3A-E are block diagrams that illustrate a rasterizing of a surface element (surfel) included in a partition plane.

FIG. 4A is a diagram showing an example graph for a function for a filter included in a source camera window space.

FIG. 4B is a block diagram showing two overlapping surfel footprints as projected into a source camera window space.

Like reference symbols in the various drawings indicate like elements.

DETAILED DESCRIPTION

Figure 1C:
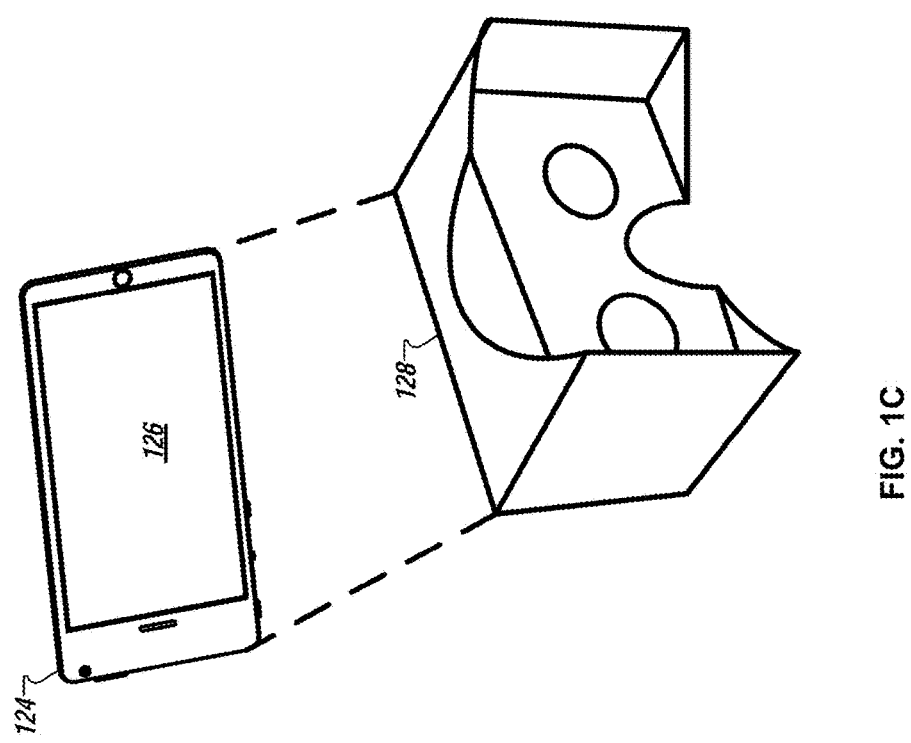
FIG. 1C is a diagram that illustrates a VR headset that includes (incorporates, houses) a mobile computing device.

A Layered Depth Image (LDI) can be an image-base representation of a three-dimensional (3D) scene. An LDI can include a two-dimensional (2D) array or group of layered depth pixels. Each layered depth pixel can include a set of LDI samples sorted along one line of sight as viewed from a single camera position or perspective. The camera can be referred to as an LDI camera. Other ways of referring to an LDI sample can include, but are not limited to, a point, a depth pixel, or a layered depth pixel sample. For each LDI sample, a camera, referred to as a source camera, provides data associated with the LDI sample. A representation of a LDI pixel can include color information, alpha channel information, depth information (a distance between the pixel and the camera), an identifier for a source camera for an LDI sample (e.g., a number, a pointer or a reference to the camera), and other attributes that can support the rendering of the LDI in a three-dimensional (3D) space. For example, the alpha channel information can be used to determine an opacity level for the pixel.

A partitioning algorithm can gather or group LDI samples included in an LDI representation of a scene into one or more partitions. For example, a partition can be a subset of LDI samples. A partition plane can be a plane in 3D space that approximately includes (e.g., includes all, less than all, or at least one of) locations of LDI samples that belong to the partition. A plane can be an infinite two-dimensional (2D) geometric object. A partition polygon can be a 3D polygon contained in the partition plane which contains the locations of the LDI samples that belong to the partition.

The partitioning algorithm can be used as part of a larger image-processing pipeline that can process image-based scene data (e.g., an LDI representation of the scene) into partitions. Each partition can include a subset of the complete set of LDI samples (or points) included in an LDI representation of a scene. For each partition, a partition plane can be determined (computed) such that the partition plane approximately includes (e.g., includes all, less than all, or at least one of) LDI samples that belong to a partition. A polygon in 3D space can be determined (computed) from the subset of LDI samples included in the partition and the partition plane. The polygon can be situated (located or placed) in the partition plane. The polygon can approximately include (e.g., include all, less than all, or at least one of) the locations of all LDI samples within the partition.

Color is then added to (mapped to) each polygon. To provide the color, the LDI samples included in a partition are rasterized in order to create a texture map for each partition. Each partition, therefore, can be turned into a texture-mapped polygon using, for example, RGBA textures (red, green, blue, alpha textures where alpha is an opacity channel).

The implementations described herein include efficient systems and methods for generating hole-free, anti-aliased, crisp textures in a 3D space from an LDI representation of a scene. A computing system can generate a texture map for a polygon. The generating can include selecting a source camera that includes a source camera window space. The source camera can be a camera that generated a plurality of LDI samples for inclusion in a LDI. In some implementations, there may be no guarantee that the LDI samples within the same partition have been captured (or generated, or included in the LDI) by the same source cameras. In general, LDI samples of a partition can be captured by a plurality of source cameras (e.g., more than one source camera).

An LDI sample in its partition plane can be projected to a point in the source camera window space. The source camera window space can include a plurality of pixels. The point can be projected into at least one pixel included in an image plane of the source camera. The point can then be projected from the source camera window space back into the partition plane. The projecting can result in a surface element (surfel) at a location of the point in the partition plane. The size of a surfel can be determined by an image filter defined in a source camera window space that can be referred to as a source filter. The surfel can have an associated color based on the color of the pixel the point was projected into in the image plane of the source camera. A target camera that includes a target camera window space can be selected. A surfel in the partition plane can be projected into to a surfel footprint in the target camera window space. The surfel footprint can cover, overlap, or include one or more pixels included in an image plane of the target camera window space. The one or more pixels can be filled with the color associated with the surfel. Each of the one or more pixels can include a plurality of pixel samples or points. Each of the plurality of pixel samples can be projected from the target camera window space to the partition plane. Each of the plurality of pixel samples can be projected from the partition plane and into the source camera window space identifying a current location for each pixel sample in the source camera window space. A color weight can be applied to each pixel sample based on the identified current location of each pixel sample in the source camera window space. The partition plane and the texture map can be combined to form a model of a scene for rendering in real time in three dimensions (3D) in a virtual reality space.

Figure 9:
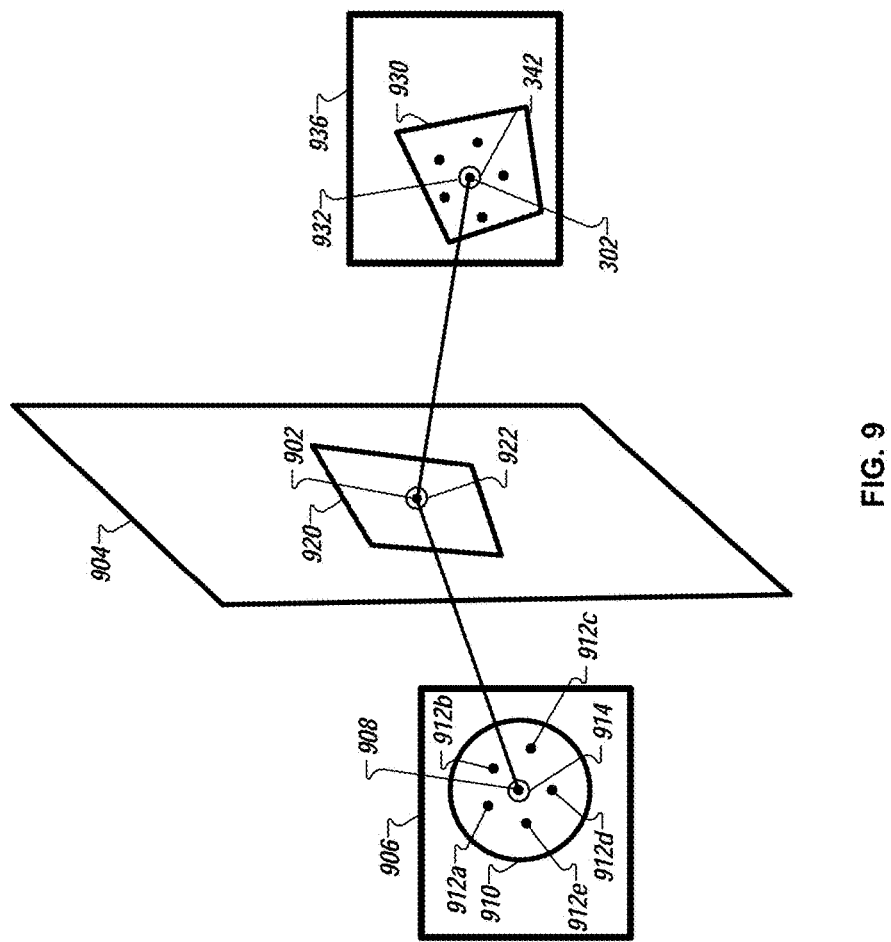
FIG. 9 is a block diagram that illustrates the generating of a texture map by a texture rasterizer for a partition plane.

FIG. 9 is a block diagram that illustrates the generating of a texture map by a texture rasterizer for a partition plane 904. A point 902 in the partition plane 904 can be projected into a source camera window space 906 resulting in a projected point 908. The projected point 908 can be part of or included in a pixel in the source camera window space. The pixel can have an associated color. The projected point 908 can be projected back into the partition plane 904 resulting in a surfel 922 with a surfel footprint 920. A color is associated with the surfel 922 that is the color associated with the pixel that includes the projected point 908. The surfel 922 and the surfel footprint 920 can be projected into a target camera window space 936 resulting in a projected surfel footprint 930 and a projected surfel 932. One or more pixels covered by or overlapped by the projected surfel footprint 930 can be colored with or filled in with the color associated with the surfel 922 (and now associated with the projected surfel 932).

The projected surfel footprint 930 and the projected surfel 932 along with points overlapped by the projected surfel footprint 930 are projected back into the partition plane 904 and then projected from the partition plane 904 to the source camera window space 906. A filter 910 can overlap and include a projected surfel 914 and points 912a-e. The points 912a-e are shown for illustrative purposes. In some implementations, the filter can overlap more than five points as shown in the example of FIG. 9. A filter function for the filter 910 can provide or assign each point included in (e.g., overlapped by) the filter 910 with a weight for a color of the point. The color weight for the point can be based on a distance of the point from the projected surfel 932.

The projected surfel 932 and points 912a-e are projected back into the partition plane 904 where the texture rasterizer can generate a texture map for the partition plane 904 using the assigned color and color weight for each point. For example, the points can be referred to as sub-pixels.

FIGS. 1A-D are diagrams of various types of virtual reality (VR) headset devices that can be configured to process a Layered Depth Image (LDI) in accordance with the implementations described herein. FIGS. 1A-D will be described in more detail later in this document.

Figure 2:
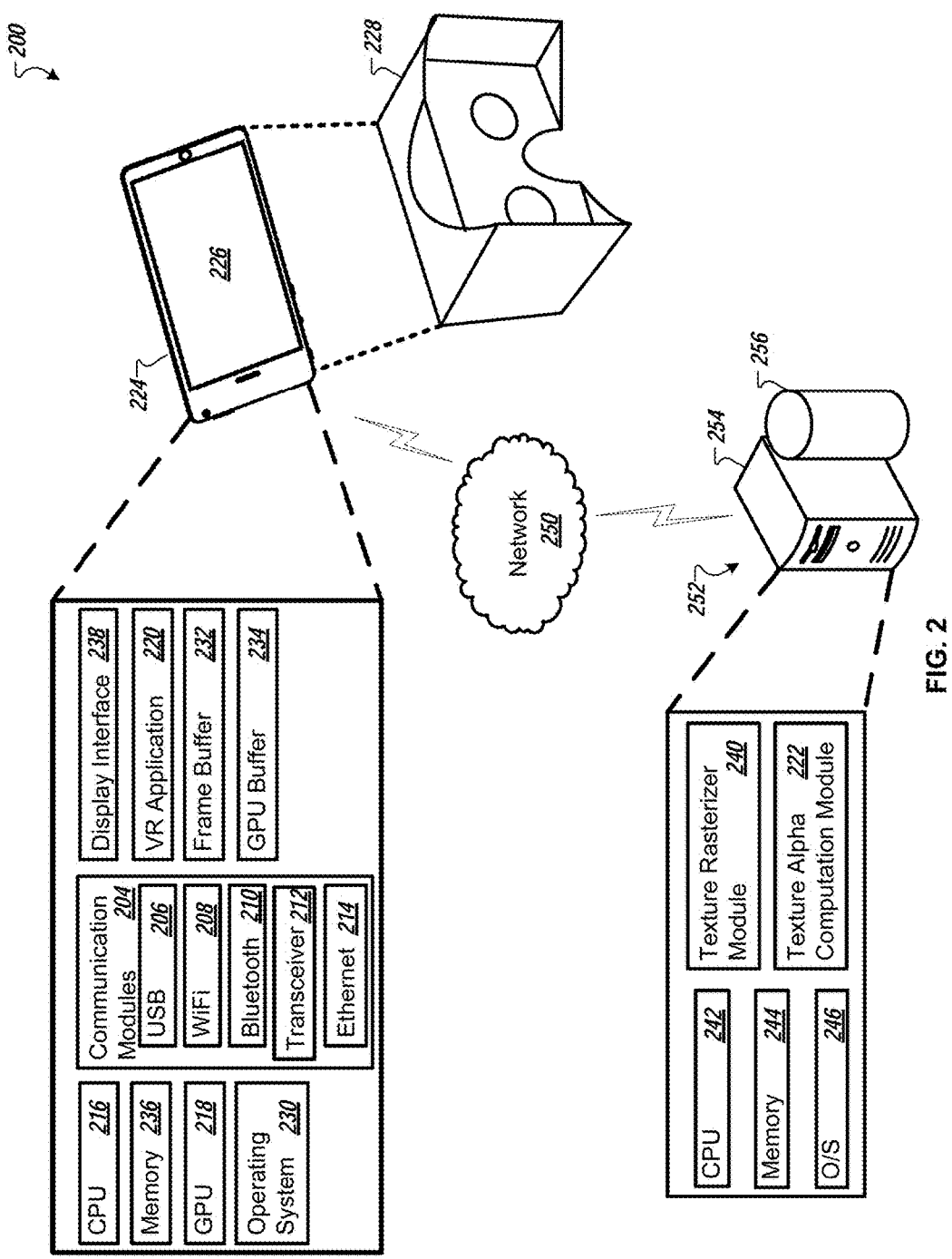
FIG. 2 is a block diagram of an example system for creating and interacting with a three dimensional (3D) virtual reality (VR) environment that includes a texture rasterizer module and a texture alpha computation module.

FIG. 2 is a block diagram of an example system 200 for creating and interacting with a three dimensional (3D) virtual reality (VR) environment that includes a texture rasterizer module 240 and a texture alpha computation module 222. For example, FIG. 2 shows components that can be included in an example computing device 224 interfaced to and/or included within (housed in, incorporated in) a VR headset 228.

Referring to FIGS. 1A-C, the computing device 224 can be a mobile computing device 104, a mobile computing device 114, and/or a mobile computing device 124. The VR headset 228 can be a VR headset 108, a VR headset 118, and/or a VR headset 128. The computing device 224 can include circuitry and software (applications) that can generate and provide image data and information on a display device included in the VR headset 228. In some implementations, as shown in FIG. 2, a display device (a screen 226) included in the computing device 224 can be the display device for the VR headset 228 when the computing device 224 is included in (is part of, is incorporated in) the VR headset 228. In some implementations, a screen included in the VR headset 228 can be the display device for the VR headset 228. In these implementations, the computing device 224 can connect to (interface with) the screen included in the VR headset 228.

FIGS. 3A-E are block diagrams that illustrate a rasterizing of a surface element (surfel) included in a partition plane. In some implementations, referring to FIG. 2, one or more applications executing in the computing system 252 can generate images of a scene from various positions within a field of view in a VR headset (a headbox) (e.g., the VR headset 228). Each scene image can include a plurality of pixel samples or points that include associated color information, depth information, and a value for a surface normal. A point can be a location in 3D space that has no volume, no size, and/or no extent. A point can represent a location of a pixel as seen through the center of a pixel from a center of a source camera. The number of pixels in a view of an image can be determined based on a resolution of the image.

For example, a pixel when projected into a representation of a surface can be considered a surfel. Surfels can be used to efficiently render complex geometric objects in a 3D space in real-time (at interactive frame rates). A surfel can include an LDI sample. A surfel can be a primitive that lacks any specific connectivity. As such, surfels can be used to model dynamic geometry because topology information, such as adjacency information, does not need to be computed. Attributes of a surfel can include, but are not limited to, color, position in 3D space, radius, opacity, and normal.

Each scene image can be assembled into a data structure (e.g., an LDI) that can be used in a representation of a simplified version of the scene for rendering (drawing) in real time in 3D in a VR space by the VR application 220. For example, the plurality of LDI samples can be grouped into multiple partitions. A partition can includes a subset of the plurality of LDI samples that represent the 3D scene. A partition polygon can approximately include (e.g., include all, less than all, or at least one of) LDI samples at particular locations in a partition. The partition polygon can be at a location (situated) in a plane in 3D space which can be referred to as a partition plane. In some implementations, a quadrangulation algorithm can create polygon approximations that can be used to create one or more partitions. In some implementations, an iterative partitioning algorithm can create the polygon approximations that can be used to create one or more partitions. The quadrangulation algorithm and the iterative partitioning algorithm are described in U.S. patent application Ser. No. 15/246,040 to Pharr et al., filed on Aug. 24, 2016, concurrently filed and commonly owned, which is incorporated by reference herein in its entirety.

A texture map can be created (e.g., generated) for each partition. An algorithm for creating polygons can be used to create a 3D polygon for each partition using the partition plane and the set of LDI samples within the partition. Each partition polygon and its associated texture map can be combined to form a model (a simplified representation) of the scene for rendering (drawing) in real time in 3D in a VR space by the VR application 220 included in the computing device 224. The algorithm executed by the VR application 220 when rendering the model of the scene can be based on the algorithm used to create each of the partition planes.

For example, an input scene can be a cube that includes 60,000 LDI samples distributed among the six faces of the cube. A partition algorithm can find the six faces of the cube and partition the LDI samples included in each face into a respective partition polygon. Each partition can be considered a plane that can includes 10,000 points from the 60,000 points.

Referring to FIG. 3A, the LDI samples included in a partition are rasterized in order to create (generate) a texture map for the partition polygon. Point 302 can be the location of one of many LDI samples included in the partition plane 304. A color for each LDI sample included in the partition plane is incorporated into the texture map. A texture rasterizing algorithm (e.g., the texture rasterizing algorithm that is part of the texture rasterizer application included in the texture rasterizer module 240) can create (generate) a texture map for a given partition polygon (e.g., included in the partition plane 304) that includes RGBA textures.

Referring, for example, to FIGS. 3A-E, the texture rasterizer can select a source camera that includes a source camera window space 306 that can be an image plane of the source camera. A source camera can generate and provide LDI samples for an LDI. The texture rasterizer can select a target camera that includes a target camera window space 336 that can be an image plane of the target camera. The texture rasterizer can select the source camera for an LDI sample and the target camera for a given partition where the partition includes samples from a LDI. In general, LDI samples within a same partition may be generated by several source cameras, rather than a single source camera. In some implementations, a selection of a target camera is based on a camera that has the best view of the partition plane. In some implementations, the source camera is the LDI camera. In some implementations, the source camera is the camera that provided (generated) the LDI sample being rasterized. In some implementations, the target camera can be a virtual camera.

Figure 3B:
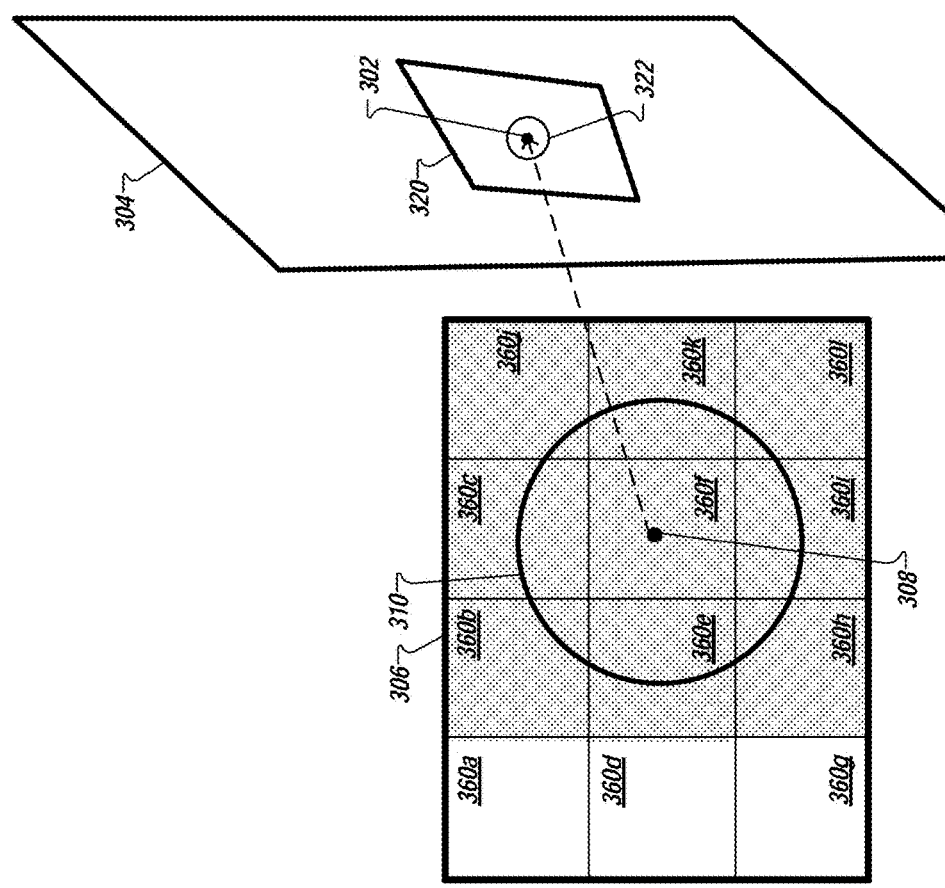

Each point that represents the location of an LDI sample can be included in a partition that can be projected into a source camera window space. Referring to FIG. 3A, the source camera window space 306 can include a plurality of pixels (e.g., pixels 360a-1). When projected, a point (e.g., the point 302) is projected into at least one pixel (e.g., pixel 360f) included in the image plane of the source camera (the source camera window space 306) resulting in the projected point 308. An image processing filter can be referred to as a source filter. The source filter can be a scalar valued filter function defined on the source camera window space 306. The filter function can be evaluated (applied or centered) at various locations within the source camera window space 306. For example, referring to FIG. 3A, the filter function is centered at the point 308. The filter function can be nonzero in a region of a particular size and shape shown as filter 310. The particular size and shape region shown as filter 310 can be referred to as a filter support located around (centered at) the point 308 (the center of the filter 310). The filter support (e.g., shown as the filter 310) is of a particular size and shape region (e.g., a circle with a particular radius as shown in the example of FIGS. 3A-B), and is included in the source camera window space 306. The filter support (e.g., shown as the filter 310) is placed around the projected point 308. The filter support (e.g., shown as the filter 310) can define a shape that can overlap, either fully or partially, pixels included in the source camera window space 306. In the example shown in FIG. 3A, the filter support (e.g., shown as the filter 310) overlaps either fully or partially the shaded pixels (e.g., pixels 360b-c, pixels 360e-f, and pixels 360h-1) that include the pixel 360f that includes the projected point 308. The shape of the filter support (e.g., shown as the filter 310) can also define a size for the projected point 302 in the source camera window space 306.

Referring to FIGS. 3A-B, the projected point 308 together with the filter support (e.g., shown as the filter 310) when projected back into the partition plane 304 results in a surfel 322 at the LDI sample shown at the location of the point 302 in the partition plane 304. For example, a plurality of rays (e.g., rays 311a-d) can be drawn from a rectangle in the source camera window space that includes the filter support (e.g., shown as the filter 310) to the partition plane 304. The rectangle can be the smallest (minimum size) rectangle in the source camera window space that includes (completely includes) the filter support (e.g., shown as the filter 310). The intersection of the rays with the partition plane 304 can define a surfel footprint 320 for the surfel 322. Described herein, and shown for example in FIGS. 3A-E, is an alternative process for identifying a surfel footprint that uses projections. In some implementations, a surfel footprint can be identified using ray tracing.

The circular shaped filter (e.g., the filter support (e.g., shown as the filter 310)) can define a size of a surfel centered at the point 302 (e.g., surfel 322) in the image plane of the source camera (e.g., the source camera window space 306). The filter support (e.g., shown as the filter 310) (e.g., the circle with a particular radius as shown in the example of FIGS. 3A-B) along with the projected point 308 can be projected back into the partition plane 304. In some implementations, a rectangle (e.g., the smallest rectangle, a minimum sized rectangle) in the source camera window space that includes (encompasses or encloses) the filter support (e.g., shown as the filter 310) can be identified. Projecting each of the four vertices of the identified rectangle back into the partition plane 304 results in, for the example shown in FIGS. 3A-C, a quadrilateral surfel footprint (e.g., the surfel footprint 320). In addition, the surfel footprint 320 provides (defines) a size for the surfel centered at the point 302 in the partition plane 304. The surfel footprint 320 is a 3D shape for the surfel 322.

The color of the surfel 322 can be the color of the corresponding LDI sample. A size associated with the filter support (e.g., shown as the filter 310) can determine a size for a surfel footprint. In some implementations, a size for a surfel footprint can be approximately the same for each surfel footprint. In addition or in the alternative, a location of the source camera relative to the partition plane can also contribute to the determination of a size for a surfel footprint.

A pixel that is projected into a partition plane that is from a first source camera will result in a surfel footprint that is larger than a surfel footprint that results from a pixel projected into the partition plane from a second source camera when the location of the first source camera is closer to the partition plane than the location of the second source camera. A best source camera can be selected for each surfel. Therefore, each surfel may be associated with a different source camera.

As described, the partition plane 304 can include a subset of the plurality of LDI samples that represent the scene image. Projecting multiple LDI samples included in the partition plane 304 into the source camera window space 306 and then back into the partition plane 304 can result in the partition plane 304 including multiple surfels with varying surfel footprints.

Each surfel included in a partition plane has an associated color. The color associated with a surfel can be the color of the projected pixel from the source camera. For example, the color associated with the surfel 322 can be the color of the pixel 360f Creating a texture map for the surfels included in a partition polygon provides the color needed for rendering (drawing) the partition polygon in a scene in real time in 3D in a VR space.

In general, a partition can be input to the texture rasterizer. The texture rasterizer can produce and output a texture map and a matrix for the partition. The output texture map can include RGBA textures. The matrix can project points from texture space onto a partition plane in an LDI eye-space (the eye space of the LDI camera).

Figure 3C:
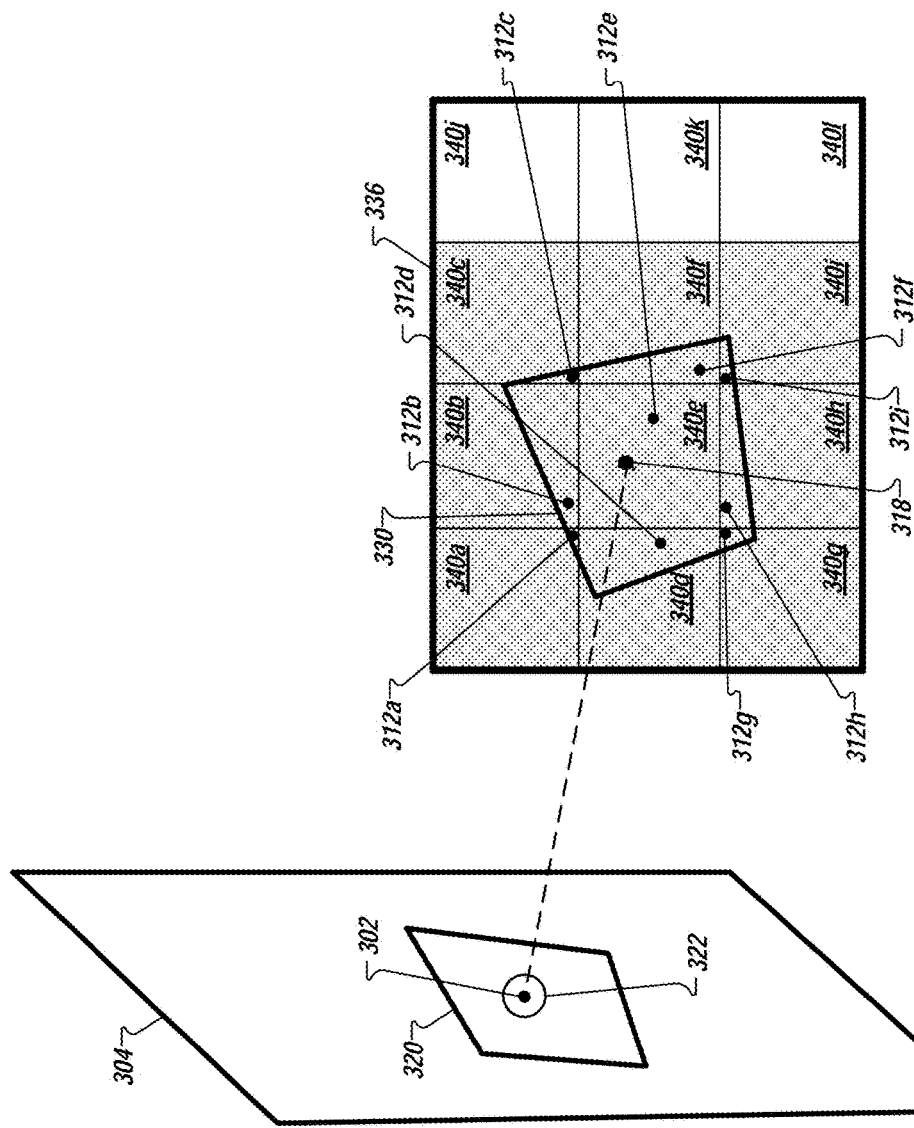

The texture rasterizer can define a target camera. In some implementations, the target camera can be the same as the source camera. In some cases, the target camera may be a different camera than the source camera. Referring to FIG. 3C, the surfels included in the partition plane (e.g., surfel 322 included in the partition plane 304) can be projected into a target camera window space (e.g., the target camera window space 336). The projection of the surfel 322 includes projecting the point 302 (projected point 318) into a pixel 340e and projecting the surfel footprint 320 (projected surfel footprint 330).

Referring to FIGS. 3A-E, the texture rasterizer can define a texture map (an image of the texture) as pixels in the target camera window space 336. Projecting the partition plane 304 into the target camera window space 336 results in, for the surfel 322, a surfel footprint 330 that includes the sub-pixel samples 312a-e. Each sub-pixel sample (e.g., the sub-pixel samples 312a-e) included in a surfel (e.g., the surfel 322 defined by the surfel footprint 330) can be projected back from the texture space (e.g., the target camera window space 336) onto the partition plane (e.g., the partition plane 304). Each sub-pixel sample (e.g., the sub-pixel samples 312a-e) included in a surfel (e.g., the surfel 322 defined by the surfel footprint 330) that is projected back from the texture space (e.g., the target camera window space 336) onto the partition plane (e.g., the partition plane 304) can then be projected from the partition plane (e.g., the partition plane 304) into a source camera window space (e.g., the source camera window space 306). In the source camera window space (e.g., the source camera window space 306) a source filter for the surfel (the filter support (e.g., shown as the filter 310) for the surfel 322) can be evaluated to compute an alpha value for the each sub-pixel sample. A color of a sub-pixel sample can be the color of the surfel, which is the color of the LDI sample the surfel was derived from. Color and alpha values of sub-pixel samples that belong to the same pixel in a target camera window space can be averaged using the alpha value associated with each sub-pixel as a weight. The computed averages can then be the color and alpha values for the pixel resulting in the smooth blending of adjacent surfels.

The target camera window space can be an image plane. The image plane can include pixels 340a-1. The image plane of the target camera has an associated resolution based on the number of included pixels. For example, as shown in FIGS. 3A-C, the resolution of the image plane of the target camera (the target camera window space 336) is the same as the resolution of the image plane of the source camera (the source camera window space 306). In some implementations, the resolution of the image plane of the target camera can be different than the resolution of the image plane of the source camera. In some implementations, a resolution of a source camera is not the same as, or related to, a resolution of a target camera.

The target camera window space 336 can include a plurality of pixels 340a-1. The projected surfel footprint 330 can include (cover) the pixels 340a-i included in the target camera window space 336. Referring to FIG. 3C, the pixels 340a-i included (covered) by the surfel footprint 330 are shown as shaded. The pixels 340a-i that are covered by (overlap with) the projected surfel footprint 330 can be filled (colored in) with the color associated with the surfel 322. The pixels 340a-i can define a texture (a texture map) for the surfel 322.

The projected surfel footprint 330 can be filled with the color of the projected surfel 332. In some implementations, one or more pixels that are partially included in (overlapped by) the projected surfel footprint 330 can be filled with the color associated with the projected surfel 332. For example, pixels 340a-d and pixels 340f-i are partially covered by the projected surfel footprint 330.

Nine pixels (e.g., pixels 340a-i) are shown as included in (overlapped by) the projected surfel footprint 330. In some implementations, less than nine pixels may be included in (overlapped by) the projected surfel footprint 330. In some implementations, more than nine pixels may be included in (overlapped by) the projected surfel footprint 330.

Figure 3D:
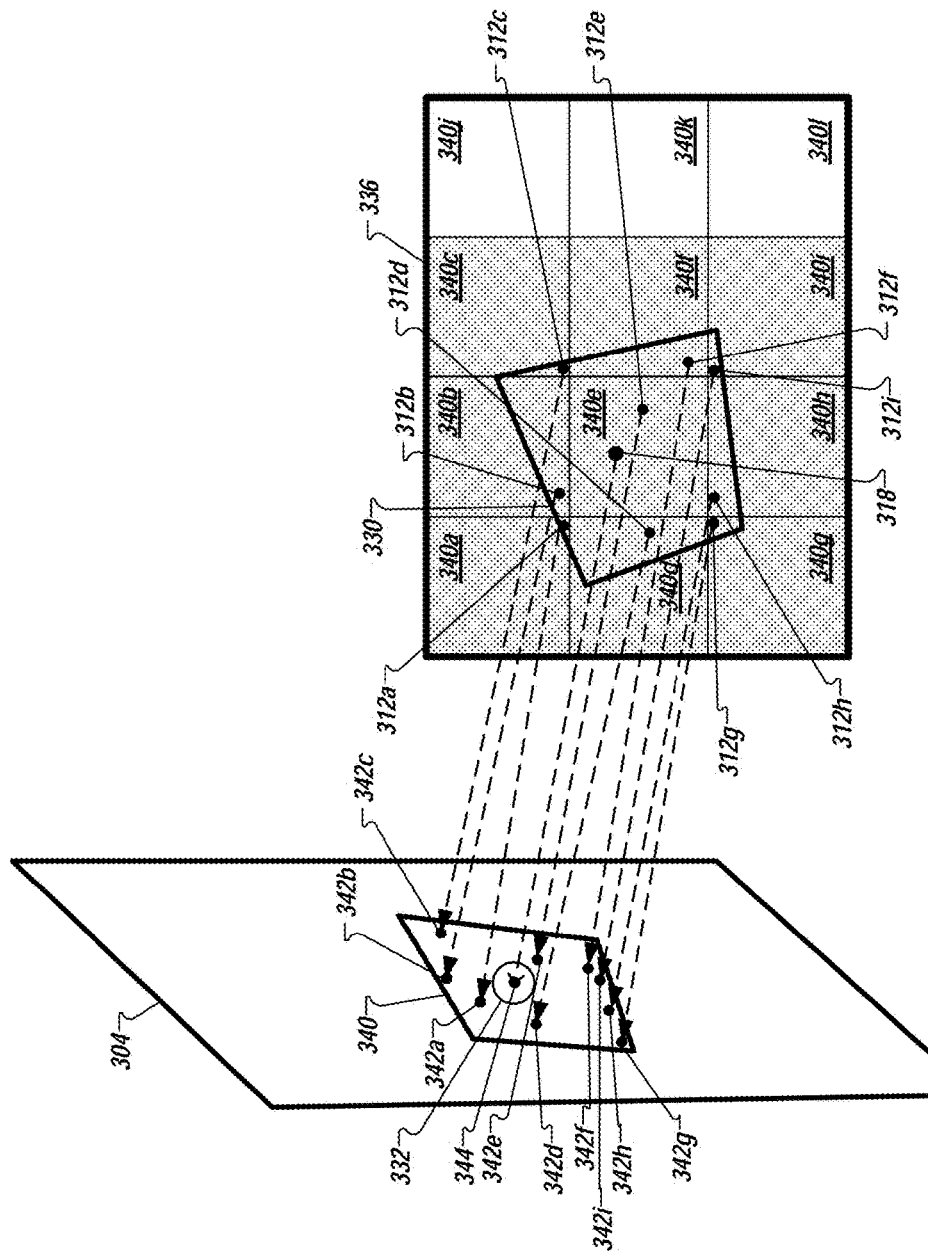

Referring to FIGS. 3C-D, a pixel can include a plurality of sub-pixel samples. For example, multiple sub-pixels samples (e.g., eight sub-pixel samples, sixteen sub-pixel samples) can be included in a pixel. For illustration purposes, FIGS. 3C-D show sub-pixel samples 312a-i, showing a sub-pixel sample for each respective pixel 340a-i covered by the projected surfel footprint 330. Each pixel 340a-1 can include more than a single sub-pixel sample. The sub-pixel samples covered by the projected surfel footprint 330 (e.g., sub-pixel samples 312a-i) can be projected back into the partition plane 304 resulting in a projected surfel footprint 340 that includes projected sub-pixel samples (e.g., projected sub-pixel samples 342a-i, respectively). The projection includes projecting the point 318 resulting in the projected point 344 in the projected surfel 332.

The projected surfel footprint 340 shown in FIG. 3D is of the same size, the same shape, and is in the same location in the 3D space as the surfel footprint 320 as shown in FIG. 3C. The color associated with the projected surfel 332 is the color associated with the surfel 322.

Figure 3E:
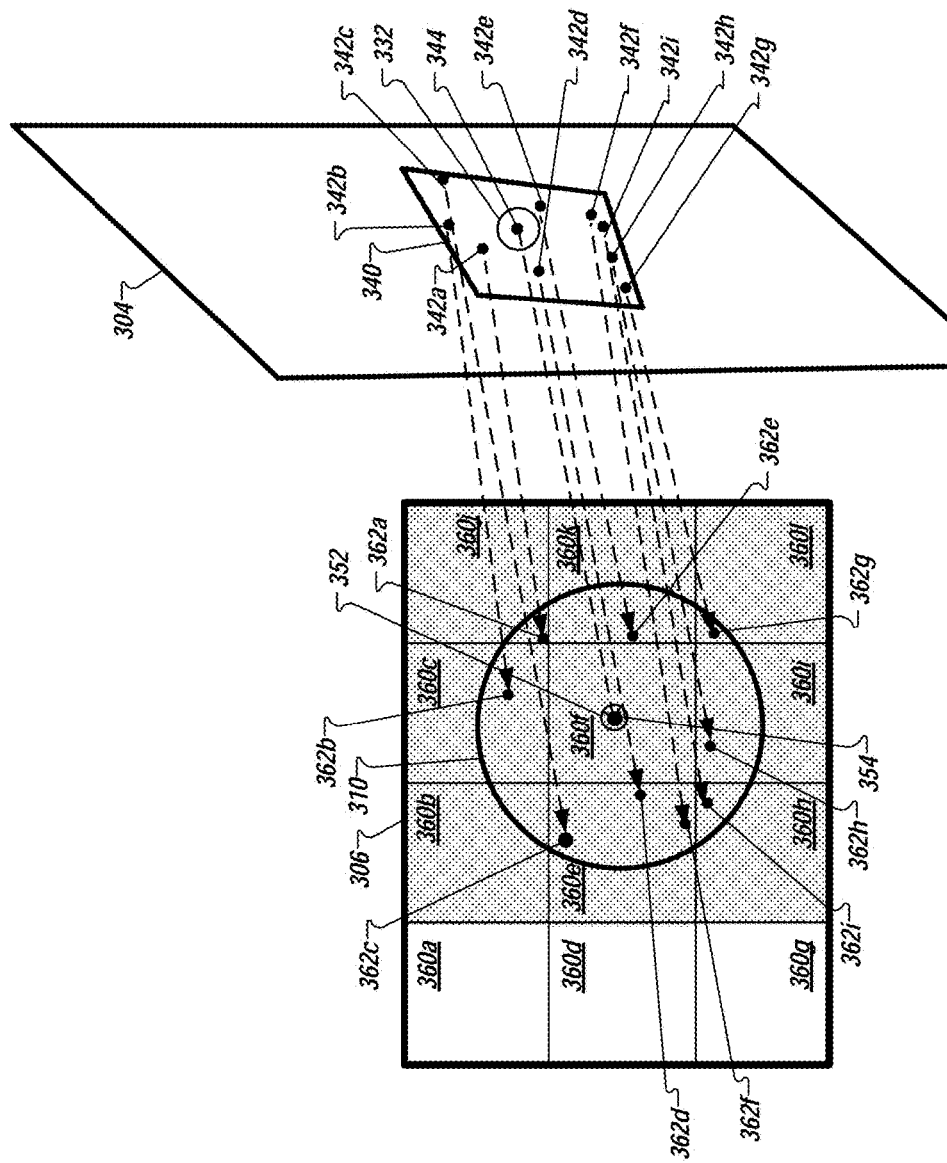

Referring to FIGS. 3C-E, each sub-pixel sample included in a projected surfel footprint included in a partition plane can be projected back into a source camera window space. The projecting can identify a current location for the sub-pixel sample in the source camera window space. For example, sub-pixel samples 342a-i can be projected back into the source camera window space 306 as projected sub-pixel samples 362a-i. For example, the projected sub-pixel sample 362a identifies a location in the source camera window space 306 for the projected sub-pixel sample 342a, which is the projection of the sub-pixel sample 312a from the target camera window space 336. For example, the sub-pixel sample 312a can be generated in the target camera window space 336 as a sub-pixel included in the pixel 340a.

The filter support (e.g., shown as the filter 310) can have an associated function that provides each pixel sample or point included in (overlapped by) the filter support (e.g., shown as the filter 310) with a weight for a color of the point. The color weight for the point can be based on a distance of the point from the point located in the center of the filter support (e.g., shown as the filter 310) (e.g., a projected point 354). The point 354 and the surfel 332 when projected back into the source camera window space 306 can result in a surfel 352 whose center is the point 354. For example, a point can be a sub-pixel.

FIG. 4A is a diagram showing an example graph 400 for a function for a filter (e.g., the filter support (e.g., shown as the filter 310)) included in a source camera window space (e.g., the source camera window space 306). In the example shown in FIG. 4, the function is a bell curve. As locations for points become farther away from the center point, the weight for a color (e.g., the color saturation) for a point decreases. For example, the color of the point 354 will have the greatest weight (be the most saturated). As the location of a point increases from the point 354, the weight of a color for the point (the saturation of the color) decreases. Referring to FIG. 3E, the points 362a-i have been included as points on the bell curve.

The use of a bell curve results in a smooth fall off in the saturation of the color for the points included in (covered by) the filter support (e.g., shown as the filter 310). In some implementations, the color may fall off to almost a transparency (no color at all).

Referring to FIGS. 3A-E, the partition plane 304 may include multiple surfels and associated surfel footprints. Each surfel and its associated footprint can be projected back into the source camera window space 306 and the filter support (e.g., shown as the filter 310 can be applied. In some cases, one surfel footprint may overlap an adjacent surfel footprint. Having the function for the filter support (e.g., shown as the filter 310) be a bell curve ensures a smooth blending between adjacent surfels. The blending of the colors of neighboring surfels is improved.

A partition can include more than one surfel (e.g., two or more surfels). In some implementations, each surfel may be associated with a different source camera. In some implementations, each surfel may be associated with the same source camera. In some implementations, some surfels may be associated with a first source camera and other surfels may be associated with a second source camera. For example, the best source camera can be picked for a particular surfel.

A color for a sub-pixel sample included in a surfel footprint (e.g., the surfel footprint 340) that is projected back into a source camera window space (e.g., the source camera window space 306) and included in a filter (e.g., the filter support (e.g., shown as the filter 310)) can be determined (calculated) based on the color value for the surfel included in the center of the filter (e.g., the color of the surfel 332 which is the color of the surfel 352). An example calculation to determine a color for a sub-pixel sample p1 in the target camera window space 336 (Color (p1)) is shown by Equation 1.

$$\text{Color}(p1) = \text{Sum}\_\{i=1\}((\text{color}_i) \times (\text{weight}_i)) \div \Sigma_{i=1}^n \text{weight}_i \qquad \text{Equation 1:}$$

Where p1 is the sub-pixel sample, n is the number of surfels that have footprints that included (cover) the sub-pixel sample p1, i is an index for the n number of surfels, $\text{color}_i$ is the color of the $\text{surfel}_i$, and $\text{weight}_i$ is the weight of the $\text{surfel}_i$ at the sub-pixel sample p1.

FIG. 4B is a block diagram showing two overlapping surfel footprints as projected into a source camera window space. The surfel footprints are projected into a source camera window space 410 (which is similar to the source camera window space 306 as shown in FIGS. 3A-E). A color for each of the pixel samples included in the projected surfel footprints is determined by a respective filter function for a filter support (e.g., shown as filter 412) and a filter support (e.g., shown as filter 414). For example, the filter function for the filter 412 and the filter 414 can be a bell curve as shown in FIG. 4A. In some implementations, a representation for a shape of a surfel can be the same as (or approximately the same as) the shape of the filter support. As a sub-pixel sample is located farther from a center surfel (e.g., center surfel 416 and center surfel 418) the intensity (saturation) of the color decreases. A color weight for the center surfel is a maximum value. Color weights for sub-pixel samples that are not the center surfel decrease as the distance between the center surfel and the sub-pixel samples increases.

A sub-pixel sample 422 can be included in (covered by) the filter support (e.g., shown as the filter 412) and the filter support (e.g., shown as the filter 414 as shown by an overlap area 420. The sub-pixel sample 422 can have a first weighted color value for the color value associated with the center surfel 416 and a second weighted color value for the color value associated with the center surfel 418. The weight for the first color value for the sub-pixel sample 422 can be dependent on the distance between the center surfel 416 and the sub-pixel sample 422. The weight for the second color value for the sub-pixel sample 422 can be dependent on the distance between the center surfel 418 and the sub-pixel sample 422. A color for the sub-pixel sample 422 can be a shade of the blending of the color of the center surfel 416 and the center surfel 418. The shade of the blended color for a sub-pixel sample included in the overlap area 420 can depend on the location of the point in the overlap region.

For example, a sub-pixel sample 408 for the center surfel 416 can be red. The center surfel 416 can be a saturated red and a color weight for the center surfel 416 can be a maximum color weight value. For example, a point 406 for the center surfel 418 can be blue. The center surfel 418 can be a saturated blue and a color weight for the center surfel 418 can be a maximum color weight value. The sub-pixel sample 422 included in (covered by) the filter 412 and the filter 414 in the overlap area 420 can have a red weighted color value and a blue weighted color value. A color for the sub-pixel sample 422 can be a shade of purple. The shade of purple for a sub-pixel sample included in the overlap area 420 can depend on the location of the point in the overlap region. The blending of pixel sample colors in an overlap area can result in a smooth blending of the colors between surfels.

As described herein with reference to FIGS. 3A-E and 4A-B, surfels can be rasterized into planes of a mesh for a 3D image. An algorithm for performing the rasterization can take a partition plane as input and produce a texture map and a matrix as output. The partition plane can include a plane in LDI eye-space and an array of surfels in LDI eye-space. Each surfel can be associated with a source camera (e.g., a camera that generated the surfel). A texture or texture map can be generated in a window-space of a target camera (e.g., a target camera window space). In some implementations, a target camera can be an LDI reference camera. In some implementations, a target camera can be a camera that has a better view of the partition plane.

A shape of a surfel can be defined in a windows-space of the source camera (e.g., a source camera window space). The shape of the surfel can be defined by placing a filter kernel (e.g., by placing a filter in the source camera window space) at the position of the surfel. A 3D shape for the surfel can be determined by projecting a reconstruction of the filter back into the partition plane resulting in a surfel footprint in the LDI eye-space in the partition plane. The surfel footprint is then projected into the target camera window space and rasterized into the texture (e.g., a texture map is generated).

For example, a rasterization can be performed in a multi-sampled frame buffer using low-discrepancy samples. Each pixel sample included in the surfel footprint can be projected back from the target camera window space into the partition plane. In some implementations, a matrix can be generated that is used when projecting the pixel samples or points from the target camera window space to the partition plane (e.g., in an LDI eye space). Once in the partition plane, the pixel samples can then be projected from the partition plane into the source camera window space. In the source camera window space, a filter can be used to compute an alpha value (a color saturation value) for each projected pixel sample. The use of a filter to compute the alpha value for each pixel sample can ensure the smooth blending of adjacent surfels.

Figure 5:
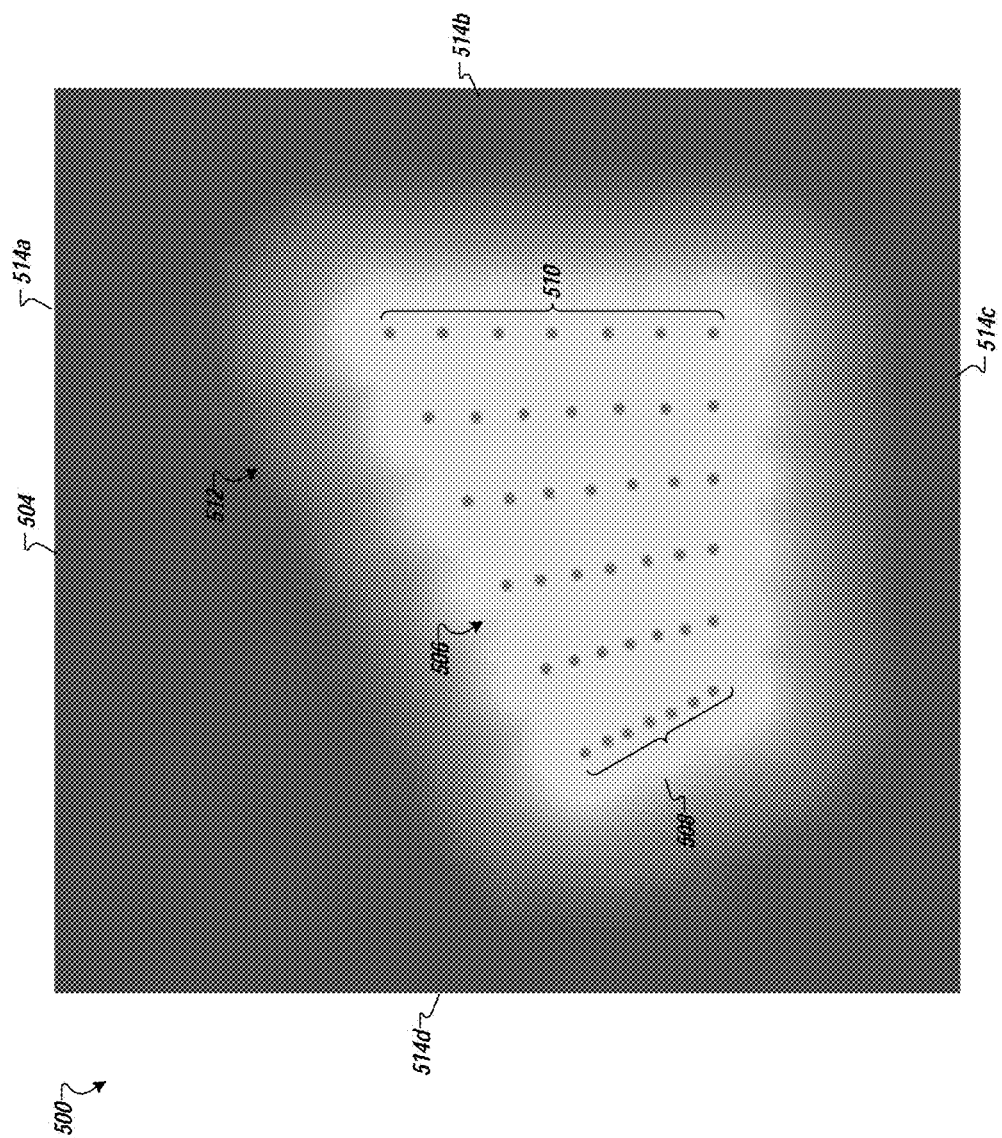
FIG. 5 is block diagram showing a partition polygon that includes a plurality of surfels.

FIG. 5 is block diagram 500 showing a partition polygon 504 that includes a plurality of surfels. The points or dots (points 506) shown in the partition polygon 504 represent a center point for each surfel included in the partition polygon 504. For example, the partition polygon 504 can be the partition plane 304 as shown in FIGS. 3A-E. As described herein, in particular with reference to FIGS. 3A-E, a texture map can be created for a partition plane (e.g., the partition polygon 504). The texture map is created from (computed from) surfels included in the partition plane (e.g., the surfels included in the partition polygon 504). The points 506 are rasterized in order to create the texture map for the partition polygon 504. As described, each of the points 506 has an associated color that includes a red (R), green (G), and blue (B) color value, and associated alpha channel information, which is an opacity value (A). The partition polygon 504 can be turned into a texture-mapped polygon that incorporates and uses RGBA textures.

In some implementations, in order to achieve a smooth transition between partitions, adjacent partitions can be blended in areas where they may overlap. Calculating alpha channel information for a texture map for a partition polygon (e.g., the partition polygon 504) can involve meeting certain goals or criteria so that there is a smooth transition from a particular partition polygon to partition polygons adjacent to the particular partition polygon.

An opacity value (A) for a surfel can be an alpha value or component included in the texture map for the partition polygon. An opacity value of one (e.g., A=1) results in a non-transparent (fully opaque, maximum opacity) surfel. An opacity value of zero (e.g., A=0) results in a transparent surfel. In general, surfels located in the interior of a partition polygon will have an opacity value equal to one (e.g., A=1). Surfels located in the interior of the partition polygon that have an associated opacity value equal to one will be non-transparent (opaque).

A partition polygon can have soft edges so that silhouettes of objects that partially occlude other objects can be alias-free. In addition or in the alternative, partition polygons can have soft edges in order to achieve a smooth transition between adjacent partition polygons when rendering an object in 3D space. In order to achieve soft edges in all directions around a boundary of a partition polygon, alpha values for points can decay at the same speed (or decrease the same amount) as the distance of a point increases from a point located at the center of the partition polygon. Alpha values for a texture map can decay at the same speed (can decrease at the same amount) in all directions around a boundary of a partition polygon.

In some cases, when a partitioning algorithm groups LDI pixel samples included in an LDI representation of a scene into multiple partitions during a partitioning stage, information associated with a large object included in the scene (e.g., RGBA) may be subdivided into (included in) more than one partition polygon. For example, given an object with a large surface space, several partition polygons may be produced (created or generated) for the single large surface. At the location where one partition polygon meets, adjoins, or overlaps an adjacent partition polygon for the object, in order to avoid cracks or holes in the rendering of the object in the 3D space, a soft edge from the one partition polygon should seamlessly and evenly blend into the adjoining soft edge of the adjacent partition polygon. In these cases, it is important to generate a texture map that is free of cracks or holes so that artifacts are not introduced into the rendering of the large object in the 3D space and so that full opacity across the rendered object is achieved. Full texture coverage should be maintained between and across adjacent partition polygon boundaries for the same object.

An LDI merging algorithm can ensure a minimum density of one surfel per texture element (texel) included in the texture map for a partition polygon. The minimum density can be for an interior of a partition polygon. In general, the density of surfels included in a partition polygon can vary based on one or more factors that can include, but are not limited to, multiple camera views of the points in the partition polygon and perspective foreshortening. An algorithm that can perform a texture alpha computation to determine alpha values for points included in and around (adjacent to) a partition polygon can take into account variations in the density of the surfels included in the partition polygon.

For example, referring to FIG. 5, the points 506 represent a center point for surfels included in the partition polygon 504. Each of the points 506 can be considered at the center of a surfel. The diagram 500 shows a corresponding alpha texture for each surfel, shown generally as alpha texture 512 (the lighter portion of the partition polygon 504). In the example of FIG. 5, a group of points located on the left of an image included in the partition polygon 504 (shown generally as points 508) result in surfels that are located closer together (the density of the surfels is higher) than a group of points located on the right of the image (shown generally as points 510) which results in surfels that are located farther apart (the density of the surfels is lower). Edges 514a-d of the partition polygon 504 can remain soft (not hardened) in all directions independent of the density of the surfels located at the interior of the partition polygon 504. For example, the higher density surfels located on the left of the image included in the partition polygon 504 (shown generally as points 508) did not harden the edges 514a-d of the partition polygon 504.

A first goal when calculating alpha channel information for a texture map for a partition polygon (e.g., the partition polygon 504) can be the determination of a filter function or shape for each surfel included in the partition polygon. FIG. 4A shows an example of a filter function for a surfel in a source window space that is then projected back into a partition polygon. Each surfel included in a partition polygon has an associated filter function. In some implementations, the same filter function can be associated with every surfel in the partition polygon. In some implementations, each surfel in the partition polygon can be associated with a unique filter function. In some implementations, surfels included in the partition polygon can be placed into two or more groups where each group of surfels is associated with a particular filter function. Each filter function captures a color and opacity (RGBA) for the surfel. An optimal filter function can provide two properties for a partition polygon.

A first property can be for an interior of the partition polygon and a second property can be for the edges of the partition polygon. For the first property for the interior of the partition polygon, an optimal filter function can provide a projection of the surfel footprint into the partition polygon to be fully opaque without any holes or cracks, independent of the spacing between surfels (e.g., the spacing between surfels can be uneven or different from surfel to surfel). For the second property for the edges of the partition polygon, an optimal filter function can provide a falling off of the opacity of a surfel as a distance for a center point for the surfel increases from the interior of the partition polygon (e.g., from a point for a surfel at approximately the center of the interior of the partition polygon). The optimal filter function can ensure that the interior of the partition polygon is fully opaque and that a desired fall off in opacity (from opaque to transparent) occurs for surfels as the distance for a surfel increases from the interior of the partition polygon towards an edge of the partition polygon.

The choice of a filter type and size for a surfel can be based on achieving a proper blending of edges of adjacent surfels in a partition polygon. This can be applied to surfels located in the interior of the partition polygon as well as surfels located at the edges of the partition polygon.

A second goal when calculating alpha channel information for a texture map for a partition polygon (e.g., the partition polygon 504) can be the accurate rendering of object surfaces in a 3D space where the rendering is void of any cracks, holes, or other artifacts. A calculation for alpha channel information for a texture map can ensure that a smooth transition is provided between edges of adjacent partition polygons and that there is not a sharp edge transition from one partition polygon to an another adjacent partition polygon. In some implementations, an edge of a first partition polygon may touch, abut, or slightly overlap an edge of an adjacent second partition polygon. For example, each partition polygon can be created (generated) from a fully opaque surface of an object. Each partition polygon, therefore, does not include any cracks, holes, or gaps in opacity. When the rendering of the object occurs in the 3D space, the adjacent partition polygons should produce the solid opaque surface of the object without any cracks, gaps, or holes in the opacity of the rendered surface of the object. In some implementations, the first partition polygon and the second partition polygon can slightly overlap on adjacent edges of each partition polygon. The calculation of the alpha channel information for a texture map for the first partition polygon and the second partition polygon can ensure that the rendering of the overlap area for the surface of the object is fully opaque and void of cracks, resulting in no transparency on edges between partition polygons, resulting in an accurate rendering of the original surface of the object.

A first partition polygon and a second partition polygon can each represent an opaque surface of an object and can be adjacent to one another. The transparency of the edges of each partition polygon can be generated such that when an edge of the first partition polygon is overlaid on an edge of the second partition polygon no gaps or holes in the rendering of the surface of the object occur. The overlapping of the edges of the adjacent partition polygons results in no area in the rendered surface of the object that is transparent (no area in the rendered surface of the object where the sum of the two overlapping edges of the partition polygons is not fully opaque). Calculating alpha channel information for a texture map for a partition polygon assigns an opacity value (A) and color values (RGB) to surfels located along the edges of the partition polygons such that a sum of an overlapping of the adjacent edges provides a smooth blending or transition from one partition polygon to the other partition polygon.

Filter functions associated with respective surfels included in a partition polygon can determine an amount of alpha coverage of the partition polygon provided by the surfel. The coverage information for a surfel included in the partition polygon can be used to determine an alpha component for a texture map. A filter used for determining the amount of alpha coverage can be referred to as a source filter. For example, referring to FIGS. 3A-E and 4A, an example source filter can be the filter support (e.g., shown as the filter 310) included in the source camera window space 306.

The alpha coverage for a partition polygon can be computed as a level set function of the surfels included in the partition polygon. A level set function of a partition polygon can be constructed using a same type of 2-dimensional isotropic bell-shaped function that can be used by reconstruction filters.

A level set of a function of two variables f(x,y) can result in a curve in a two-dimensional xy-plane (e.g., a level curve). A level set of a function of three variables f(x,y,z) can result in a surface in three-dimensional space (e.g., a level surface).

A level set function of a single isolated surfel can be a filter function centered at a position of a surfel. A level set function of an entire partition can be defined as a level set function corresponding to the set union over all surfels. For example, the level set function corresponding to the set union over all surfels can, at each point in a texture space, take a maximum value over all surfel level functions that contribute to that texture space point (e.g., geometry operations based level sets). Filter functions associated with respective surfels included in a partition polygon can reconstruct a color value (RGB color components) and an opacity value (A) of a texture map from pixel samples or points included in a pixel, for pixels covered by the filter function. A filter function used for the reconstruction can be referred to as a target filter.

In some implementations, a same analytical form for a filter can be used for both a source filter and a target filter. In some implementations, a Gaussian bell-shaped filter can be used. An impulse response for a Gaussian filter is a Gaussian function. Referring to FIG. 4A, the example graph 400 for a function of a filter can be a Gaussian bell-shaped filter.

In some implementations, a Wendland function based filter can be used. A Wendland function based filter can provide a bell-shaped filter similar to a Gaussian filter. Wendland functions can be radial basis functions that have a specified smoothness parameter. Wendland functions can converge uniformly to a Gaussian as a smoothness parameter for the functions approaches infinity. As used herein, a Wendland filter can be based on Wendland functions. The Wendland filter can be included in a doubly indexed family of filters. For example, the double index for an example Wendland filter for use as a source filter can be the indices of (3,1). The Wendland filter can include a |radius| parameter. The Wendland filter can include properties that may be useful for antialiasing. For example, a Wendland filter can be radially symmetric. A Wendland filter can be finitely supported (e.g., zero for points farther away from the origin than |radius|). A Wendland filter can be C2 continuous at a location r=0. A Wendland filter can be C2 continuous at a location r=|radius|. A Wendland filter can be C infinity at all other locations. A Wendland filter can have a Fourier transform that is positive at every location, similar to a non-truncated Gaussian filter. B-spline basis filters, although finitely supported and non-negative at every location can have Fourier transforms with negative lobes. A Wendland filter can be simpler to evaluate than a Mitchell filter (a Mitchell-Netravali) or a cubic B-spline filter. Mitchell filters and cubic B-spline filters can be reconstruction filters for use in the antialiasing and the scaling of raster images.

In some implementations, a Wendland filter can be used both as a source filter and a target filter. For example, in one implementation, when used as a source filter for computing the coverage (alpha component) of a partition polygon, a value for the |radius| can be equal to 2.5. For example, in one implementation, when used as a target filter for computing the coverage (alpha component) of a partition polygon, a value for the |radius| can be equal to 1.36. In these implementations, the use of a Wendland filter may closely approximate (with a relative error less than 0.03) a Mitchell filter.

A texture rasterizer (e.g., referring to FIG. 2, a texture rasterizer application included in the texture rasterizer module 240) can use a multi-sample frame buffer when generating a texture map for a partition polygon. A pixel can include multiple pixel samples or points. A multi-sample frame buffer includes, for each pixel, a number, s, of pixel sample or points.

For a pixel located at a position (x,y), a coverage value for a pixel sample or point, α(x, y, s), can be computed as a maximum for all surfels that contribute to the pixel sample or point location as shown in Equation 2.

$$\alpha(x,y,s) = \max_{\sigma \in surfels}(W(\sigma,x,y,s))$$ Equation 2:

where $W(\sigma, x, y, s)$ is the value of the filter function used as the level set function of surfel, $\sigma$, at the sample position, s, within a pixel(x, y).

Rasterized surfels can be composited using the PLUS compositing operator. An alpha premultipled color, $\alpha C(x, y, s)$, of a pixel sample or point can be obtained by taking a weighted average of all surfels that cover the pixel sample or point as shown in Equation 3.

$$\alpha C(x, y, s) = \frac{\sum_{\sigma \in surfels} C_\sigma W(\sigma, x, y, s)}{\sum_{\sigma \in surfels} W(\sigma, x, y, s)} \alpha(x, y, s)$$ Equation 3 where $C_\sigma$ is the color of surfel, $\sigma$.

Cracks or holes between neighboring partition polygons can signal low alpha coverage values. A low alpha coverage value can be a result of not adding in the contributions of neighboring surfels. In order to address this problem, after the result of the partitioning algorithm is obtained, a nearest-neighbors search data structure for surfels can be built or generated including entries of the form (partition index, surfel index). A set of surfels that are neighboring a given partition polygon can be obtained or built using a nearest-neighbor's search with a search radius obtained from the diameter of a surfel in LDI eye space, which is provided by the rasterizer. Surfels that belong to the partition, as well as the neighboring surfels can be rasterized.

Figure 6:
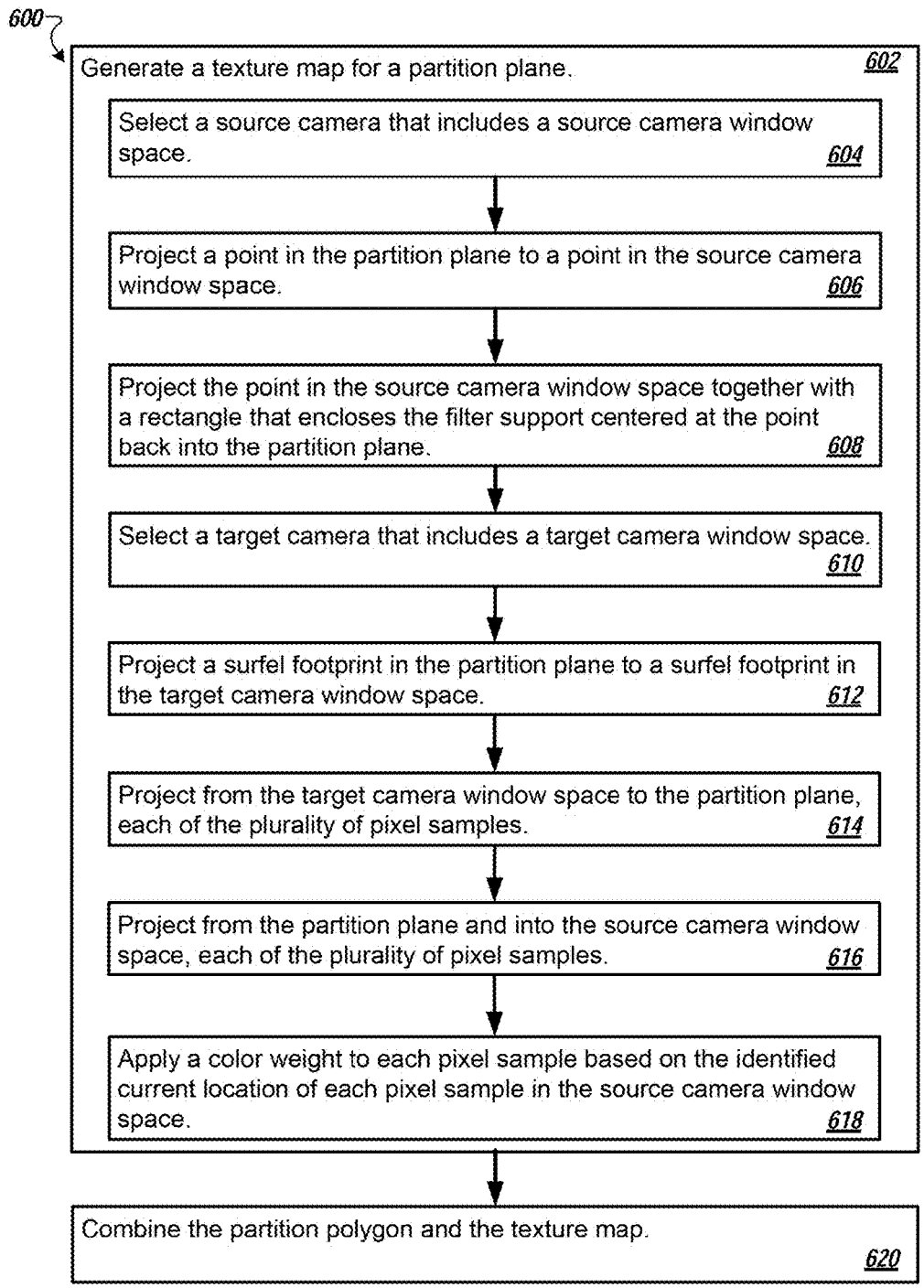
FIG. 6 is a flowchart of an example of a method that can be used to generate a texture map for a partition plane.

FIG. 6 is a flowchart of an example of a method 600 that can be used to generate a texture map for a partition plane. In some implementations, the systems, methods, algorithms, and processes described herein can implement the method 600. For example, the method 600 can be described referring to FIGS. 1A-D, 2, 3A-E, 4A-B, and 5. In particular, referring to FIG. 2, the method 600 may be performed (run, executed) by the texture rasterizing module 240.

A texture map for a partition plane is generated by a computing system (block 602). The generating can include selecting a source camera that includes a source camera window space (block 604). The source camera can be a camera that generated a plurality of points for inclusion in a layered depth image (LDI). The plurality of points included in the LDI can be included in the partition plane. For example, referring to FIGS. 3A-E, a source camera can include the source camera window space 306. The generating can include projecting a point in the partition plane to a point in the source camera window space (block 606). The source camera window space can include a plurality of pixels. The point can be projected into at least one pixel included in an image plane of the source camera. For example, the point 302 can be projected into the pixel 360f included in the image plane of the source camera (the source camera window space 306).

The generating can include projecting the point in the source camera window space together with a rectangle (e.g., the smallest rectangle) in the source window space that encloses the filter support centered at the point, back into the partition plane (block 608). The four vertices of the rectangle, when projected back into the partition plane, define a surfel footprint. The projecting can result in a surface element (surfel) at a location of the point in the partition plane. The surfel can have an associated color. For example, the projected point 308 can be projected back into the partition plane 304 resulting in the surfel 322 at the location of the LDI sample shown at the location of the point 302 in the partition plane 304. The color associated with the surfel 322 can be based on the color of the pixel 360f.

The generating can include selecting a target camera that includes a target camera window space (block 610). For example, referring to FIGS. 3A-E, a target camera can include the target camera window space 336. The generating can include projecting a surfel footprint in the partition plane to a surfel footprint in the target camera window space (block 612). The surfel footprint can cover one or more pixels included in an image plane of the target camera window space. The one or more pixels can be filled with the color associated with the surfel. Each of the one or more pixels can include a plurality of sub-pixel samples. For example, an image plane of the target camera that includes the target camera window space 336 has an associated resolution based on a number of pixels included in the image plane for the target camera. The projected surfel footprint 330 can cover the pixels 340a-i included in the target camera window space 336. In some implementations, the projected surfel footprint 330 can partially cover (not completely cover) the pixels 340a-i included in the target camera window space 336. In some implementations, the projected surfel footprint 330 can fully or completely cover the pixels 340a-i included in the target camera window space 336. The sub-pixel samples 312a-i show respective sub-pixel samples for each respective pixel 340a-i covered by the projected surfel footprint 330.

The generating can include projecting from the target camera window space to the partition plane, each of the plurality of pixel samples (block 614). For example, the sub-pixel samples 312a-i can be projected back into the partition plane 304 resulting in a projected surfel footprint 340 that includes the projected sub-pixels 342a-i, respectively.

The generating can include projecting from the partition plane and into the source camera window space, each of the plurality of pixel samples (block 616). The projecting can identify a current location for each pixel sample in the source camera window space. For example, the sub-pixel samples 342a-i can be projected into the source camera window space 306 as projected points 362a-i. For example, the projected sub-pixel sample 362a can identify a location in the source camera window space 306 for the projected sub-pixel sample 342a, which is the projection of the sub-pixel sample 312a from the target camera window space 336. The sub-pixel sample 312a can be generated in the target camera window space 336 as a point included in the pixel 340a.

The generating can include applying a color weight to each pixel sample based on the identified current location of each pixel sample in the source camera window space (block 618). For example, the filter support (e.g., shown as the filter 310) can have an associated function that provides each pixel sample overlapped by the filter support (e.g., shown as the filter 310) with a weight for a color of the pixel sample. The color weight for a sub-pixel sample can be based on a distance of the sub-pixel sample from the sub-pixel sample located in the center of the filter support (e.g., shown as the filter 310).

The partition polygon and the texture map can be combined by the computing system (block 620). The combining of a partition polygon and a texture map for all partitions can form a model of a scene for rendering in real time in three dimensions (3D) in a virtual reality space.

Figure 7:
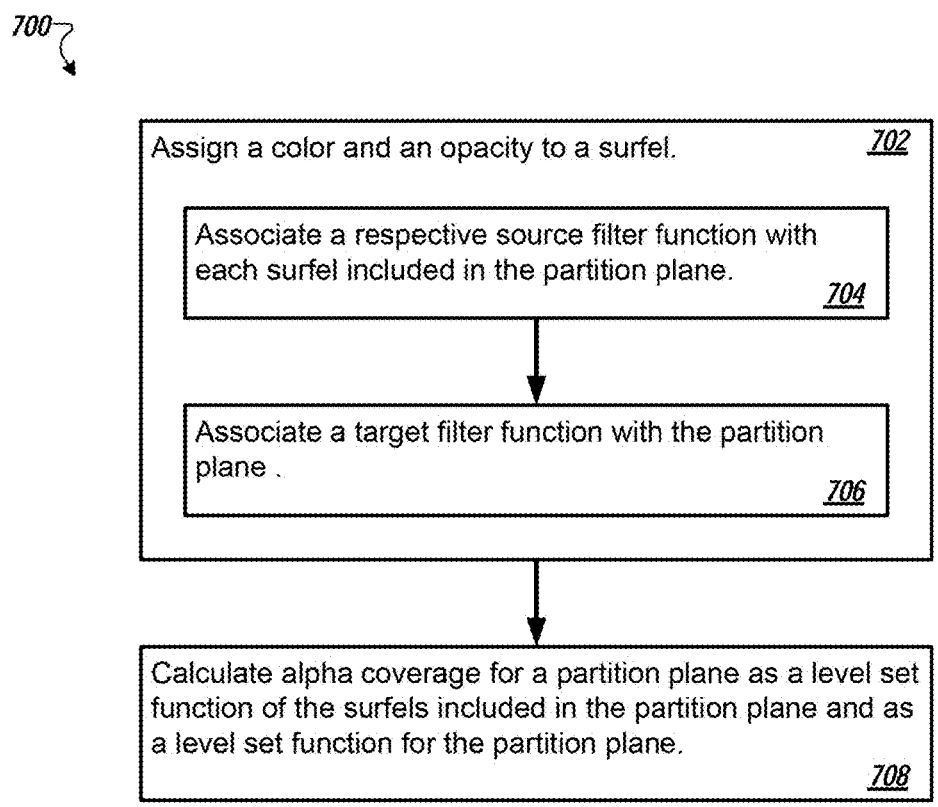
FIG. 7 is a flowchart of an example of a method for calculating alpha channel information for a texture map for a partition plane.

FIG. 7 is a flowchart of an example of a method 700 for calculating alpha channel information for a texture map for a partition plane. In some implementations, the systems, methods, algorithms, and processes described herein can implement the method 700. For example, the method 700 can be described referring to FIGS. 1A-D, 2, 3A-E, 4A-B, and 5. In particular, referring to FIG. 2, the method 700 may be performed (run, executed) by the texture alpha computation module 222.

A color and an opacity is assigned to a surfel by a computing system and for each surfel included in a partition plane (block 702). The assigning can be dependent on a location of the surfel in the partition plane. For example, each of the points 506 has an associated color that includes a red (R), green (G), and blue (B) color value, and associated alpha channel information, which is an opacity value (A). Each point can be the center of a respective surfel.

The assigning can include associating a respective source filter function with each surfel included in the partition plane (block 704). The source filter function can determine an amount of alpha coverage of the partition plane provided by the respective surfel.

The assigning can include associating a target filter function with the partition plane (block 706). The target filter function can provide a projection of a surfel footprint into a partition plane to be fully opaque. The target filter function can provide a falling off of the assigned opacity of a surfel as a distance for a center point for the surfel increases from an interior of the partition plane.

Alpha coverage for a partition plane as a level set function of the surfels included in the partition plane and as a level set function for the partition plane can be calculated (block 708). A level set function of a surfel can be the associated respective source filter function centered at a position of the surfel. A level set function for the partition plane can be the associated target filter function. For example, the partition polygon 504 can be turned into a texture-mapped partition that incorporates and uses RGBA textures.

FIG. 1A is a diagram that illustrates a mobile computing device 104 connected to (interfacing with) a VR headset 108 using a cable 102. The mobile computing device 104 can connect to (communicate with) the VR headset 108 using one or more high-speed communication protocols such as, for example, USB 2.0, USB 3.0 and USB 3.1. In some cases, the mobile computing device 104 can connect to (communicate with) the VR headset 108 using an audio/video interface such as, for example, High-Definition Multimedia Interface (HDMI). In some cases, the mobile computing device 104 can connect to (communicate with) the VR headset 108 using a DisplayPort Alternate mode for a USB Type-C standard interface. The DisplayPort Alternate mode can include a high-speed USB communication interface and DisplayPort functions.

The cable 102 can include an appropriate connector on either end for plugging into the VR headset 108 and the mobile computing device 104. For example, the cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors.

FIG. 1B is a diagram that illustrates a mobile computing device 114 connected to (interfacing with) a VR headset 118 using a wireless connection 112 without the need for a cable (e.g., the cable 102 as shown in FIG. 1A). The mobile computing device 114 can connect to (communicate with) the VR headset 118 using the wireless connection 112 by implementing one or more high-speed communication protocols such as, for example, WiFi, Bluetooth, or Bluetooth Low Energy (LE).

FIG. 1C is a diagram that illustrates a VR headset 128 that includes (incorporates, houses) a mobile computing device 124. In some implementations, the VR headset 128 can include a removable computing device (e.g., the mobile computing device 124). For example, a mobile computing device of a user (e.g., the mobile computing device 124) can be placed inside of (within) the VR headset 128 when the user wishes to immerse themselves in a VR space. In some cases, the mobile computing device 124 can also be removed from the VR headset 128, for example, when a user is done immersing themselves in the VR space.

In some implementations, a mobile computing device (e.g., the mobile computing device 124) can be permanently included (incorporated within, housed in) a VR headset (e.g., the VR headset 128). The mobile computing device 124 can be incorporated within (housed within, be part of) a casing or frame of the VR headset 128. In some implementations, a display device 126 included in the mobile computing device 124 can be the display device for the VR headset 128. The mobile computing device 124 can provide the display or screen (e.g., the display device 126) for viewing by a user when interacting with a computer-generated, 3D environment (a VR space). In some implementations, the VR headset 128 can include a separate display device. In these implementations, the mobile computing device 124 can interface to the separate display device that is part of the VR headset 128.

FIG. 1D is a diagram that shows a user 130 wearing a VR headset 138. The VR headset 138 can be the VR headset 108, the VR headset 118, or the VR headset 128 as shown in FIGS. 1A-C, respectively. For example, referring to FIGS. 1A-C, a mobile computing device connected to and/or included in the VR headset 138 can execute one or more applications to provide a computer-generated, 3D environment (a VR space or experience) to the user 130 while wearing the VR headset 138.

Referring to FIGS. 1A-D, in some implementations, each mobile computing device (e.g., the mobile computing device 104, the mobile computing device 114, and the mobile computing device 124) can run one or more applications that can provide a VR experience to a user.

Referring back to FIG. 2, the computing device 224 includes communication modules 204. The communication modules 204 can include, but are not limited to, a USB communication module 206, a WiFi communication module 208, a Bluetooth communication module 210, a transceiver 212, and an Ethernet (e.g., IEEE 802.3) communication module 214. The communication modules 204 can be used to establish connections and communications between the computing device 224 and one or more external networks (e.g., network 250), systems (e.g., computing system 252), and/or devices.

In addition or in the alternative, the computing device 224 can use one or more of the communication modules 204 to establish communications with (a connection to) a VR headset. In some implementations, one or more connectors included on the computing device 224 can connect to (interface with) connectors included on in a VR headset. For example, connecting (interfacing) the computing device 224 to a VR headset can allow the computing device 224 to provide image data and information for display on a display device included in the VR headset where the display device is not included on the computing device 224.

The computing device 224 can include a central processing unit (CPU) 216 and a graphics processing unit (GPU) 218. The CPU 216 can include one or more processors that can perform general computing operations for the computing device 224. For example, the CPU 216 can execute (run) one or more applications (e.g., a VR application 220) on the computing device 224. The one or more applications can be included in (stored in) a memory (e.g., memory 236). For example, the VR application 220 can render (create) a computer-generated, 3D environment (a VR space). The computing device 224, and specifically the CPU 216, can execute an operating system (O/S) 230.

The GPU 218 can include one or more processors that can perform graphics-specific operations on the computing device 224 such as image drawing, scaling, and rotation. For example, the GPU 218 can execute (run) one or more applications on the computing device 224. The GPU 218 can prepare image data and information for input to a display interface 238 for subsequent displaying on a display device (e.g., the screen 226).

The display interface 238 can prepare data representative of a 3D image for display on a display device. As described herein, the display interface 238 can provide the data representative of the 3D image to the screen 226 in implementations where the screen 226 is the display device for a VR headset. In implementations where the display device for the VR headset is not included in the computing device 224, the display interface 238 can provide the data representative of the 3D image to a screen or display device included in the VR headset but external to the computing device 224.

A frame buffer 232 can be one or more memory devices that can store a final rendered image for display on a display device (e.g., the screen 226). The display interface 238 can access and interface with the frame buffer 232 in order to provide the data representative of the 3D image to the display device (e.g., the screen 226).

A GPU buffer 234 can be one or more memory devices that can store pre-computed multiple LDI representations of a scene (multiple LDIs) from different viewpoints or perspectives, each of the multiple LDIs being for different parts of the scene. The GPU 218 can access the GPU buffer 234 to retrieve an LDI representation of an image. The GPU 218 can render the LDI representation of the image for input to the display interface 238 for display on the screen 226 as an image in a 3D VR space. In some implementations, the GPU 218 can include the GPU buffer 234. In some implementations, the GPU buffer 234 can be accessed by and interfaced to the GPU 218.

The system 200 includes a computer system 252 that can include one or more computing devices (e.g., server 254) and one or more computer-readable storage devices (e.g., a repository or database 256). The server 254 can include one or more processors (e.g., server CPU 242), and one or more memory devices (e.g., server memory 244). The computing device 224 can communicate with the computer system 252 (and the computer system 252 can communicate with the computing device 224) using the network 250. The server 254 can execute a server O/S 246, and one or more server applications including a texture rasterizer application included in the texture rasterizer module 240 and an alpha computation application included in the texture alpha computation module 222. A module can include software, firmware, and/or hardware that can be configured to implement an algorithm, method, or process for presenting image data in 3D in a VR space. For example, a texture rasterizing algorithm can be part of the texture rasterizer application included in the texture rasterizer module 240. The texture rasterizing algorithm can generate a texture map for a given partition polygon that includes RGBA textures. For example, the texture alpha computation application included in the texture alpha computation module 222 can compute (generate) an alpha value equal to one for points determined to be in the interior of a partition and decaying values of alpha (values decreasing from one to zero) as movement is away from the interior points of the partition. The applications, modules, and algorithms are described in more detail later in this document.

In some implementations, the server 254 can be a workstation. In some implementations, the computer system 252 can be included in a data center. In some implementations, the texture rasterizer application (the texture rasterizer module 240) and the alpha computation application (the texture alpha computation module 222) can be included in the computing device 224.

Figure 8:
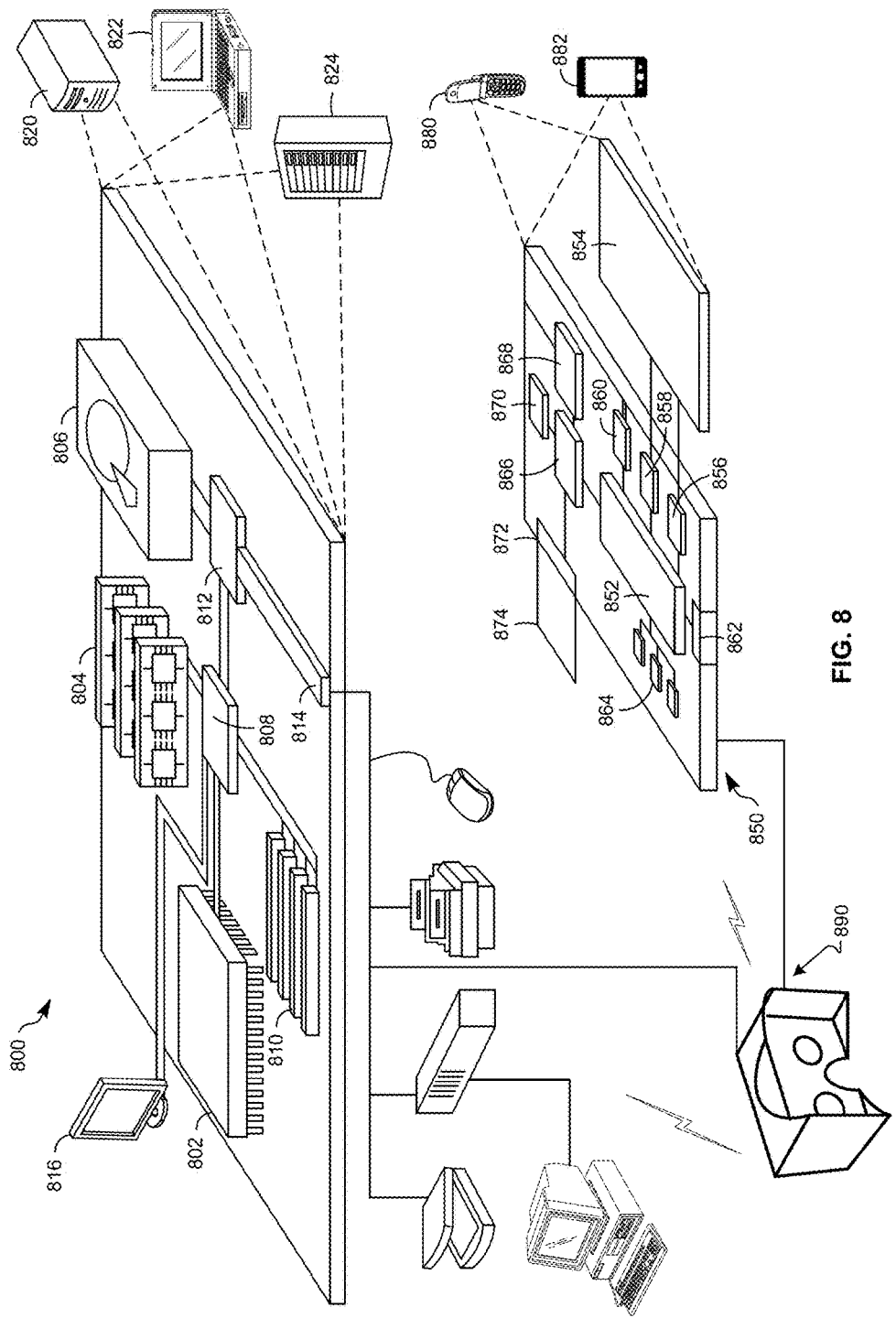
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (HMD device 890). For example, one or more sensors included on a computing device 850 or other computing device depicted in FIG. 8, can provide input to HMD device 890 or in general, provide input to a VR environment. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR environment that can then be used as input to the VR environment. For example, the computing device 850 may be incorporated into the VR environment as a virtual object, such as a controller, a laser pointer, a keyboard, a weapon, etc. Positioning of the computing device or virtual object by the user when incorporated into the VR environment can allow the user to position the computing device to view the virtual object in certain manners in the VR environment. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR environment. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR environment can cause a particular action to occur in the VR environment.

In some implementations, a touchscreen of the computing device 850 can be rendered as a touchpad in VR environment. A user can interact with the touchscreen of the computing device 850. The interactions are rendered, in HMD device 890 for example, as movements on the rendered touchpad in the VR environment. The rendered movements can control objects in the VR environment.

In some implementations, one or more output devices included on the computing device 850 can provide output and/or feedback to a user of the HMD device 890 in the VR environment. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR environment. In the example of the laser pointer in a VR environment, the computing device 850 appears as a virtual laser pointer in the computer-generated, 3D environment. As the user manipulates the computing device 850, the user in the VR environment sees movement of the laser pointer. The user receives feedback from interactions with the computing device 850 in the VR environment on the computing device 850 or on the HMD device 890.

In some implementations, a computing device 850 may include a touchscreen. For example, a user can interact with the touchscreen in a particular manner that can mimic what happens on the touchscreen with what happens in the VR environment. For example, a user may use a pinching-type motion to zoom content displayed on the touchscreen. This pinching-type motion on the touchscreen can cause information provided in the VR environment to be zoomed. In another example, the computing device may be rendered as a virtual book in a computer-generated, 3D environment. In the VR environment, the pages of the book can be displayed in the VR environment and the swiping of a finger of the user across the touchscreen can be interpreted as turning (flipping) a page of the virtual book. As each page is turned (flipped), in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR environment to control objects in the VR environment.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
generating, by a computing system, a texture map for a partition polygon including:
projecting a Layered Depth Image (LDI) sample in a partition polygon to a point in a source camera window space;
projecting the point in the source camera window space back into the partition polygon as a surface element (surfel) having an associated color at a location of the LDI sample in the partition polygon;
projecting the surfel in the partition polygon to a surfel footprint in a target camera window space, the surfel footprint covering at least one pixel included in an image plane of the target camera window space;

projecting from the target camera window space to the partition polygon, each of a plurality of sub-pixel samples included in the at least one pixel;
projecting from the partition polygon and into the source camera window space, each of the plurality of sub-pixel samples, the projecting determining a location in the source camera window space for each of the plurality of sub-pixel samples; and
applying a color weight to each sub-pixel sample based on the location of each sub-pixel sample in the source camera window space; and
combining, by the computing system, the partition polygon and the texture map, the combining forming a model of a scene for rendering in real time in three dimensions (3D) in a virtual reality space.

2. The method of claim 1, wherein the LDI sample is a one of a plurality of LDI samples included in a layered depth image (LDI) included in the partition polygon.

3. The method of claim 2, wherein projecting the LDI sample in the partition polygon to the point in the source camera window space is performed for each LDI sample included in the plurality of LDI samples included in the partition polygon.

4. The method of claim 1, wherein the at least one pixel is filled with the color associated with the surfel.

5. The method of claim 1, wherein the point in the source camera window space is placed at a center of a filter support included in the source camera window space.

6. The method of claim 5, wherein projecting the point in the source camera window space back into the partition polygon includes projecting the point along with vertices of a minimum size rectangle that includes the filter support.

7. The method of claim 6, wherein the projecting of the point in the source camera window space back into the partition polygon includes:
projecting the filter support into the partition polygon; and
projecting a pixel defined by the filter support in the source camera window space into the partition polygon.

8. The method of claim 7, wherein the color associated with the surfel is based on a color of the pixel.

9. The method of claim 5, wherein the filter support is a circle having a particular radius and being centered at the point in the source camera window space.

10. The method of claim 5, wherein the filter support defines a shape that overlaps pixels included in the source camera window space.

11. The method of claim 10, wherein the shape of the filter defines a size for the point projected from the source camera window space back into the partition polygon resulting in the surfel.

12. The method of claim 1, wherein projecting the surfel in the partition polygon to the surfel footprint in the target camera window space is performed for each surfel included in the partition polygon.

13. The method of claim 1,
wherein the target camera window space is an image plane including a plurality of pixels,
wherein the plurality of pixels identify a resolution of the image plane,
wherein a projected surfel footprint for the projected surfel covers one or more of the pixels in the image plane, and
wherein the one or more of the pixels are the color associated with the surfel.

14. The method of claim 1, wherein the color weight is based on a distance that a sub-pixel is from a center point of a filter support, the sub-pixel being included in the filter support.

15. A computer-implemented method comprising:
assigning, by a computing system and for each surfel included in a partition polygon, a color and an opacity to a surfel, the assigning comprising:
associating a respective source filter function with each surfel included in the partition polygon, the source filter function determining an amount of alpha coverage of the partition polygon provided by the respective surfel;
associating a target filter function with the partition polygon, the target filter function providing a projection of a surfel footprint into a partition polygon to be fully opaque and providing a falling off of the assigned opacity of a surfel as a distance for a center point for a surfel increases from an interior of the partition polygon; and
calculating alpha coverage for a partition polygon as a level set function of the surfels included in the partition polygon and as a level set function for the partition polygon.

16. The method of claim 15, wherein the assigning is dependent on a location of the surfel in the partition polygon.

17. The method of claim 15, wherein a level set function of the surfel is the associated respective source filter function centered at a position of the surfel.

18. The method of claim 15, wherein a level set function for the partition polygon is the associated target filter function.

19. The method of claim 15, wherein the associated target filter function corresponds to a set union over the surfels included in the partition polygon.

20. The method of claim 19, wherein the associated target filter function that corresponds to the set union over the surfels included in the partition polygon takes, at each point in a texture space, a maximum value over surfel source filter functions that contribute to that texture space point.

21. The method of claim 19, wherein a same analytical form for a filter can be used for both the source filter function and the target filter function.

22. The method of claim 19, wherein a same filter function can be associated with each surfel included in the partition polygon.

23. The method of claim 19, wherein surfels included in the partition polygon are placed into two or more groups wherein each group of surfels is associated with a particular filter function.

* * * * *